United States Patent
Sone et al.

(10) Patent No.: US 9,976,603 B2
(45) Date of Patent: May 22, 2018

(54) PARALLEL LINK MECHANISM, CONSTANT VELOCITY UNIVERSAL JOINT, AND LINK ACTUATOR

(71) Applicant: NTN CORPORATION, Osaka-shi, Osaka (JP)

(72) Inventors: Keisuke Sone, Hamamatsu (JP); Hiroshi Isobe, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 115 days.

(21) Appl. No.: 15/067,680

(22) Filed: Mar. 11, 2016

(65) Prior Publication Data

US 2016/0195141 A1    Jul. 7, 2016

Related U.S. Application Data

(62) Division of application No. 14/352,005, filed as application No. PCT/JP2012/078017 on Oct. 30, 2012, now Pat. No. 9,316,266.

(30) Foreign Application Priority Data

Nov. 4, 2011   (JP) .................................. 2011-242605
Nov. 7, 2011   (JP) .................................. 2011-243462
Oct. 26, 2012  (JP) .................................. 2012-236452

(51) Int. Cl.
*B25J 17/00* (2006.01)
*F16D 3/30* (2006.01)
(Continued)

(52) U.S. Cl.
CPC .............. *F16D 3/30* (2013.01); *B25J 9/0048* (2013.01); *B25J 9/108* (2013.01); *B25J 19/0062* (2013.01);
(Continued)

(58) Field of Classification Search
CPC .......... F16C 19/46; F16C 19/26; F16C 19/06; F16H 21/46; Y10S 464/905; Y10T 74/20335; B25J 19/108; F16D 3/30
(Continued)

(56) References Cited

U.S. PATENT DOCUMENTS 3,477,249 A    11/1969   Culver
7,971,505 B2 *  7/2011   Isobe .................... B25J 9/0048
(Continued)

FOREIGN PATENT DOCUMENTS

EP    1 690 650    8/2006
JP    47-51502    12/1972
(Continued)

OTHER PUBLICATIONS

Rolling Bearings for Industrial Robots Takeo Yoda, Nonou Obokata, Soichi Hioki Taylor & Francis, 1990 (pp. 51-22).*
(Continued)

*Primary Examiner* — Gregory J Binda

(57) ABSTRACT

A parallel link mechanism includes a proximal end side link hub; a distal end side link hub; and three or more link mechanisms that connect the distal end side link hub to the proximal end side link hub in a position-changeable fashion. Each of the link mechanisms has a trinodal structure. Each revolute pair of each of the link mechanisms includes one pair of pair constituent members connected to each other via a bearing. One of the pair constituent members is formed with a shaft portion fitted to an inner periphery of an inner ring of the bearing, and the other of the pair constituent members is formed with an annular inner face forming portion fitted to an outer periphery of an outer ring of the bearing.

7 Claims, 12 Drawing Sheets

(51) Int. Cl.
*F16H 21/46* (2006.01)
*B25J 9/00* (2006.01)
*B25J 9/10* (2006.01)
*B25J 19/00* (2006.01)
*F16C 19/06* (2006.01)
*F16C 19/26* (2006.01)
*F16C 19/46* (2006.01)

(52) U.S. Cl.
CPC .............. *F16C 19/06* (2013.01); *F16C 19/26* (2013.01); *F16C 19/46* (2013.01); *F16H 21/46* (2013.01); *Y10S 464/905* (2013.01); *Y10T 74/20335* (2015.01)

(58) Field of Classification Search
USPC .................. 464/106, 905; 74/490.06; 901/29
See application file for complete search history.

(56) References Cited

U.S. PATENT DOCUMENTS 9,394,979 B2 * 7/2016 Yamada .................. F16H 21/46
2006/0213308 A1 9/2006 Rosheim
2008/0028881 A1 2/2008 Sone et al.

FOREIGN PATENT DOCUMENTS

| JP | 59-70276 | 4/1984 |
| JP | 8-54024 | 2/1996 |
| JP | 9-287570 | 11/1997 |
| JP | 10-286792 | 10/1998 |
| JP | 2009-248286 | 10/2009 |
| JP | 2011-93075 | 5/2011 |

OTHER PUBLICATIONS

Japanese Notification of Reasons for Rejection dated Aug. 2, 2016 in corresponding Japanese Patent Application No. 2012-236452.
Extended European Search Report dated Jun. 3, 2016 from European Patent Application No. 12846455.9, 11 pages.
Japanese Office Action dated Nov. 1, 2016 from Japanese Patent Application No. 2012-236452, 7 pages.
Extended European Search Report dated Dec. 5, 2017 in corresponding European Patent Application No. 17185740.2, 9 pages.

* cited by examiner

PARALLEL LINK MECHANISM, CONSTANT VELOCITY UNIVERSAL JOINT, AND LINK ACTUATOR

CROSS-REFERENCE TO RELATED APPLICATIONS

This application is a divisional of application Ser. No. 14/352,005, filed on Apr. 15, 2014, now U.S. Pat. No. 9,316,266, which is a National Stage Entry of PCT/JP2012/078017, filed on Oct. 30, 2012, which claims convention priority to Japanese Patent Application No. 2011-242605, filed Nov. 4, 2011, Japanese Patent Application No. 2011-243462, filed Nov. 7, 2011, and Japanese Patent Application No. 2012-236452, filed Oct. 26, 2012, in the Japan Patent Office, the entire disclosures of which are herein incorporated by reference as a part of this application.

BACKGROUND

1. Field

The present invention relates to a parallel link mechanism which can operate in a precise and wide operating range in a three-dimensional space, and relates to a constant velocity universal joint and a link actuator each equipped with the parallel link mechanism and used in a medical device, an industrial device, or the like.

2. Description of the Related Art

One example of a working device equipped with a parallel link mechanism is disclosed in Japanese Patent Publication No. 2000-94245, one example of a constant velocity universal joint which performs power transmission between two shafts is disclosed in Japanese Patent Publication No. 2002-349593, and one example of a link actuator used in a medical device, an industrial device, or the like is disclosed in U.S. Pat. No. 5,893,296.

In the parallel link mechanism of Japanese Patent Publication No. 2000-94245, the operation angle of each link is small. Therefore, in order to increase the operating range of the travelling plate, the parallel link mechanism is required to have an increased link length. Accordingly, a problem has been found that the dimensions of the mechanism as a whole increase and the apparatus tends to be bulky in size. Also, if the link length is increased, the rigidity of the mechanism as a whole tends to be lowered. For this reason, there has also been a problem that the weight of a tool mounted on the travelling plate, that is, the weight capacity of the travelling plate, is limited to a small value. For these reasons, the parallel link mechanism is difficult to be used in a medical device or the like which requires the parallel link mechanism to be compact in size and to operate in a precise and wide operating range.

The constant velocity universal joint of Japanese Patent Publication No. 2002-349593 and the link actuator of U.S. Pat. No. 5,893,296 each employ a parallel link mechanism which includes three or more trinodal chain link mechanisms, and thus, can perform power transmission in a wide operating range and precise operation despite their compactness in size. However, in order to increase the rigidity of the mechanism as a whole, if the revolute pair section of each link mechanism is increased in size, there is a problem that interference between members of the link mechanisms tends to occur and thus, the operating range is reduced. In order to prevent the interference between members of the link mechanisms, each link mechanism is required to have an increased link length, which causes another problem that the dimensions of the mechanism as a whole increase. Moreover, since the revolute pair sections of the link mechanisms oscillate, the lives of the bearings provided in the revolute pair sections may be reduced depending on their operating ranges.

SUMMARY

An object of the present invention is to provide a parallel link mechanism that can perform fast operation in a precise and wide operating range and that is light in weight and compact in size as a whole, and in addition, to provide a parallel link mechanism that can realize long lives of the bearings provided in the revolute pair sections.

Another object of the present invention is to provide a constant velocity universal joint in which the input shaft thereof and the output shaft thereof are maintained to rotate at a constant speed even when the bending angle between the central axis of the proximal end side link hub and the central axis of the distal end side link hub changes, which can perform fast operation in a precise and wide operating range, and which is light in weight and compact in size as a whole, and in addition to this object, to provide a constant velocity universal joint which can realize long lives of the bearings provided in the revolute pair sections.

A still another object of the present invention is to provide a link actuator which can alter the position of the distal end side link hub to any position relative to the proximal end side link hub, which can perform fast operation in a precise and wide operating range, and which is light in weight and compact in size as a whole, and in addition this object, to provide a link actuator which can realize long lives of the bearings provided in the revolute pair sections.

A parallel link mechanism according to the present invention is a parallel link mechanism including: a proximal end side link hub; a distal end side link hub; and three or more link mechanisms that connect the distal end side link hub to the proximal end side link hub in a position-changeable fashion, each link mechanisms having a trinodal structure with four revolute pairs, and including a proximal side end link member, one end of the proximal side end link member being pivotably connected to the proximal end side link hub; a distal side end link member, one end of the distal side end link member being pivotably connected to the distal end side link hub; and an intermediate link member which is pivotably connected to the other ends of the proximal side end link member and the distal side end link member, and each of the link mechanisms having such a shape that a geometric model of the link mechanism represented by lines shows symmetry between a proximal end side portion thereof and a distal end side portion thereof with respect to a center portion of the intermediate link member. In the parallel link mechanism of the present invention having above configuration, each revolute pair of each of the link mechanisms includes one pair of pair constituent members connected to each other via a bearing, and one of the pair constituent members is formed with a shaft portion fitted to an inner periphery of an inner ring of the bearing, and the other of the pair constituent members is formed with an annular inner face forming portion fitted to an outer periphery of an outer ring of the bearing, the shaft portion and the annular inner face forming portion cooperatively define a sealing structure to regulate a flow of a lubricant or the like between inside and outside of the bearing.

According to this configuration, the proximal end side link hub, the distal end side link hub, and the three or more link mechanisms form a two-degrees-of-freedom mechanism in which the distal end side link hub is movable in two axial directions perpendicular to each other relative to the proximal end side link hub. In other words, the mechanism allows the distal end side link hub to rotate with two degrees of freedom to alter its position, relative to the proximal end side link hub. This two-degrees-of-freedom mechanism is compact in size, but can realize a wide range of movement of the distal end side link hub relative to the proximal end side link hub. For example, the bending angle between the central axis of the proximal end side link hub and the central axis of the distal end side link hub is about ±90° at maximum, and a turning angle of the distal end side link hub relative to the proximal end side link hub can be set within a range of 0° to 360°.

Moreover, by interposing the bearing in each revolute pair, the frictional resistance in each revolute pair can be reduced, whereby the rotational resistance can be relieved. Accordingly, a smooth power transmission can be secured, and also the durability thereof can be increased. The sealing structure constructed by the shaft portion provided in one pair constituent member of the revolute pair and the annular inner face forming portion provided in the other pair constituent member regulates the flow of a lubricant or the like between inside and outside of the bearing. Thus, by constructing the sealing structure with components forming the parallel link mechanism, there is no need to provide seals implemented by other members, and thus, increase of the width dimension of the bearing can be suppressed. Accordingly, interference between components of each link mechanism is less likely to occur, and thus, the work range is expanded. In addition, since the dimensions of the periphery of the bearing are reduced, the parallel link mechanism as a whole can be made light in weight and compact in size.

In one embodiment of the present invention, the sealing structure may be defined in the form of a gap between an outer peripheral face of a part of the shaft portion and an inner peripheral face of a part of the annular inner face forming portion. The narrower the gap is, the more effectively the lubricant inside the bearing is prevented from leaking to the outside and foreign matter is prevented from entering the inside of the bearing from the outside. The shaft portion and the annular inner face forming portion are peripheral portions, around the bearing, of each pair of pair constituent members, and are portions indispensable when the bearing is to be provided in the revolute pair section. Therefore, without providing additional members, the sealing structure can be constructed.

In the case of the above configuration, the part of the shaft portion may be formed as a stepped portion having an outer diameter greater than that of a portion of the shaft portion that is fitted to the inner periphery of the inner ring of the bearing, and having a stepped surface configured to abut against an end face of the inner ring to axially position the inner ring. The stepped portion of the shaft portion is a portion that is necessary for positioning the inner ring of the bearing and that is at a short distance from the inner peripheral face of the part of the annular inner face forming portion. By using this stepped portion of the shaft portion, the sealing structure can be easily constructed in the form of a gap, without providing additional members.

Further, the part of the annular inner face forming portion may be a stepped portion having an inner diameter smaller than that of a portion of the annular inner face forming portion fitted on the outer periphery of the outer ring of the bearing, and the outer ring may be positioned in an axial direction by a stepped surface of this stepped portion abutting against an end face of the outer ring. The stepped portion of the annular inner face forming portion is a portion that is necessary to position and fix the outer ring of the bearing and that is at a short distance from the outer peripheral face of the part of the shaft portion. By using this stepped portion of the annular inner face forming portion, the sealing structure can be easily constructed in the form of a gap, without providing additional members.

In one embodiment of the present invention, an inner ring fixation element to fix an axial position of the inner ring of the bearing, and a spacer member interposed between the inner ring fixation element and the inner ring of the bearing may be further provided, and the spacer member and the annular inner face forming portion may cooperatively define a sealing structure to regulate a flow of a lubricant or the like between inside and outside of the bearing. In general, in order to allow the inner ring to receive a uniform load, a spacer member is provided between the inner ring fixation element and the inner ring. By using this spacer member, the sealing structure can be easily constructed in the form of the gap without providing additional members. Due to a problem of assemblability or the like, it is difficult to construct sealing structures at both ends of the bearing by only using the shaft portion and the annular inner face forming portion. However, by also using a sealing structure using the spacer member and the annular inner face forming portion, the sealing structures can be easily constructed at both ends of the bearing.

In the case of the above configuration, the sealing structure may be defined in the form of a gap between an outer peripheral face of a part of the spacer member and an inner peripheral face of a part of the annular inner face forming portion. The narrower the gap is, the more effectively the lubricant inside the bearing is prevented from leaking to the outside and foreign matter is prevented from entering the inside of the bearing from the outside. The spacer member is a member in a periphery around the bearing, and the annular inner face forming portion is a peripheral portion, around the bearing, of one pair constituent member, and thus, they are easy to be used in construction of the sealing structure.

Further, the annular inner face forming portion may have a portion formed as an outer ring fit portion having an outer diameter equal to an outer diameter of the outer ring of the bearing, and the outer ring may be fitted on the outer ring fit portion. By rendering the part of the annular inner face forming portion to be an outer ring fit portion whose inner diameter is equal to the outer diameter of the outer ring of the bearing, the outer ring of the bearing can be fitted to the annular inner face forming portion without using other members.

Further, the part of the annular inner face forming portion may be formed as a stepped portion having an inner diameter smaller than that of a portion of the shaft portion that is fitted to the outer periphery of the outer ring of the bearing, and having a stepped surface configured to abut against an end face of the outer ring to axially position the outer ring. The stepped portion of the annular inner face forming portion is a portion that is necessary to position and fix the outer ring of the bearing and that is at a short distance from the outer peripheral face of the part of the spacer member. Accordingly, by using this stepped portion of the annular inner face forming portion, the sealing structure can be easily constructed in the form of a gap, without providing additional members.

The inner ring fixation element may be a nut threadedly engaged on a threaded portion formed in the shaft portion. When the inner ring fixation element is a nut, not only the position in the axial direction of the inner ring of the bearing can be easily fixed, but also a preload applied to the bearing can be managed by the fastening torque.

In one embodiment of the present invention, the sealing structure may be a labyrinth structure. By employing the labyrinth structure, the sealing ability can be increased compared with that of the sealing structure in the form of a gap.

In the parallel link mechanism, as the bearing, a bearing that has a critical oscillation angle smaller than a maximum value in a possible range of a bending angle which is defined as an angle between a central axis of the proximal end side link hub and a central axis of the distal end side link hub may be employed. It should be noted that the critical oscillation angle is a minimum oscillation angle allowable in a bearing, and is a minimum oscillation angle that is defined by the specification or the like of the bearing and that can provide a rated life.

Due to the structure of the parallel link mechanism, the bearing of each revolute pair section oscillates. When the oscillation angle thereof is small, the life of the bearing under oscillation becomes long, but when the oscillation angle is reduced to some level or lower, fretting is caused and the bearing reaches the end of life early. As the bearing to be provided in the revolute pair section, if a bearing is used whose critical oscillation angle is smaller than the maximum bending angle between the central axis of the proximal end side link hub and the central axis of the distal end side link hub, a long life of the bearing can be realized. The basis thereof is described below.

In a case where the rotation angle of the proximal side end link member relative to the proximal end side link hub is $\beta n$, the angle between the connection end axis of the intermediate link member pivotably connected to the proximal side end link member and the connection end axis of the intermediate link member pivotably connected to the distal side end link member is $\gamma$, the angle of spacing in the circumferential direction of each proximal side end link member relative to a proximal side end link member that serves as a reference is $\delta n$, the bending angle being a vertical angle formed when the central axis of the distal end side link hub is inclined relative to the central axis of the proximal end side link hub is $\theta$, and the turning angle being a horizontal angle formed when the central axis of the distal end side link hub is inclined relative to the central axis of the proximal end side link hub is $\varphi$, the following relationship is established.

$$\cos(\theta/2)\sin \beta n - \sin(\theta/2)\sin(\varphi+\delta n)\cos \beta n + \sin(\gamma/2) = 0 \quad \text{(equation 1)}$$

In equation 1, from a change amount of the rotation angle $\beta n$ obtained when the turning angle $\varphi$ is changed while the maximum value of the bending angle $\theta$ is $\theta_{max}$, the range of oscillation of the proximal side end link member relative to the proximal end side link hub and the range of oscillation of the distal side end link member relative to the distal end side link hub are obtained. Each obtained range of oscillation is $\theta_{max}$. On the other hand, the range of oscillation of the intermediate link member relative to each end link member becomes greater than $\theta_{max}$ due to the structure of the parallel link mechanism. Therefore, with respect to the bearing of each revolute pair section, if the critical oscillation angle $\eta$ is set to be smaller than or equal to $\theta_{max}$, every bearing will be driven at the critical oscillation angle $\eta$ or greater, whereby a long life of the bearing can be realized.

In one embodiment of the present invention, the critical oscillation angle may be smaller than a maximum value of the bending angle in a predetermined work operation. The "predetermined work operation" mentioned above refers to operation necessarily determined due to the configuration of the apparatus where the parallel link mechanism is disposed, that is, for example, operation when the parallel link mechanism is used in a constant velocity universal joint, or work operation determined, when an actuator to drive the parallel link mechanism is provided, by a control device which controls the actuator. In a case where the actuator is provided, the work operation determined due to the functions, such as the operation range and the like, of the actuator also corresponds to the work operation above. When a bearing whose critical oscillation angle is smaller than the maximum value of the bending angle in the determined work operation is used, occurrence of fretting or the like during the determined work operation can be prevented, and thus, a further longer life of the bearing can be realized.

The bearing may be a deep groove ball bearing, and where the number of rolling elements of the deep groove ball bearing is Z, the critical oscillation angle may be set to be $2 \cdot 180/(0.555 \cdot Z \cdot \pi)[\deg]$. The value of the critical oscillation angle determined as described above substantially matches the optimum value of the critical oscillation angle obtained from experimental data.

The bearing may be a cylindrical roller bearing, and where the number of rolling elements of the cylindrical roller bearing is Z, the critical oscillation angle may be set to be $2 \cdot 180/(0.37 \cdot (Z+0.1) \cdot \pi)[\deg]$. The value of the critical oscillation angle determined as described above substantially matches the optimum value of the critical oscillation angle obtained from experimental data.

The bearing may be a needle roller bearing, and where the number of rolling elements of the needle roller bearing is Z, the critical oscillation angle may be set to be $2 \cdot 180/(0.544 \cdot Z \cdot \pi)[\deg]$. The value of the critical oscillation angle determined as described above substantially matches the optimum value of the critical oscillation angle obtained from experimental data.

A constant velocity universal joint of the present invention includes any one of the parallel link mechanisms above, wherein the proximal end side link hub of this parallel link mechanism is provided with an input shaft, and the distal end side link hub of this parallel link mechanism is provided with an output shaft. Each link mechanism of the parallel link mechanism has such a shape that a geometric model of the link mechanism depicted in lines shows symmetry between a proximal end side portion thereof and a distal end side portion thereof with respect to an intermediate portion of the intermediate link member. Therefore, due to geometric symmetry, the proximal end side link hub and the proximal side end link member, and the distal end side link hub and the distal side end link member move in the same manner, and the proximal end side and the distal end side have the same rotation angle and rotate at an equal speed. Accordingly, even when the bending angle between the central axis of the proximal end side link hub and the central axis of the distal end side link hub changes, the input shaft and the output shaft are maintained to rotate at a constant speed.

A link actuator of the present invention is a link actuator in which two or more link mechanisms among the three or more link mechanisms in any one of the parallel link mechanisms above are each provided with a position changing actuator which alters an angle of at least one revolute pair among the four revolute pairs thereof. With respect to each of at least two of the three or more link mechanisms, if the rotation angle of the proximal side end link member is determined, the position of the distal end side link hub relative to the proximal end side link hub is also determined. Thus, by providing a position changing actuator to each of at least two of the three or more link mechanisms, and appropriately controlling each position changing actuator, the position of the distal end side link hub can be altered to any position relative to the proximal end side link hub. Further, by using the parallel link mechanism that can realize lightness in weight and compactness in size as described above, the link actuator can be made light in weight and compact in size.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
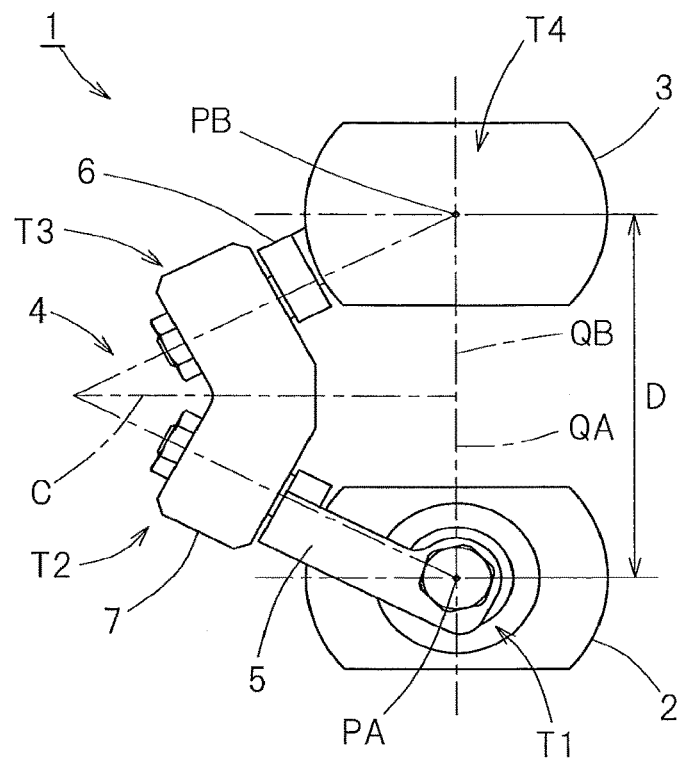
FIG. 1 is a front view showing a parallel link mechanism, with a portion thereof omitted, according to a first embodiment of the present invention.
Figure 2:
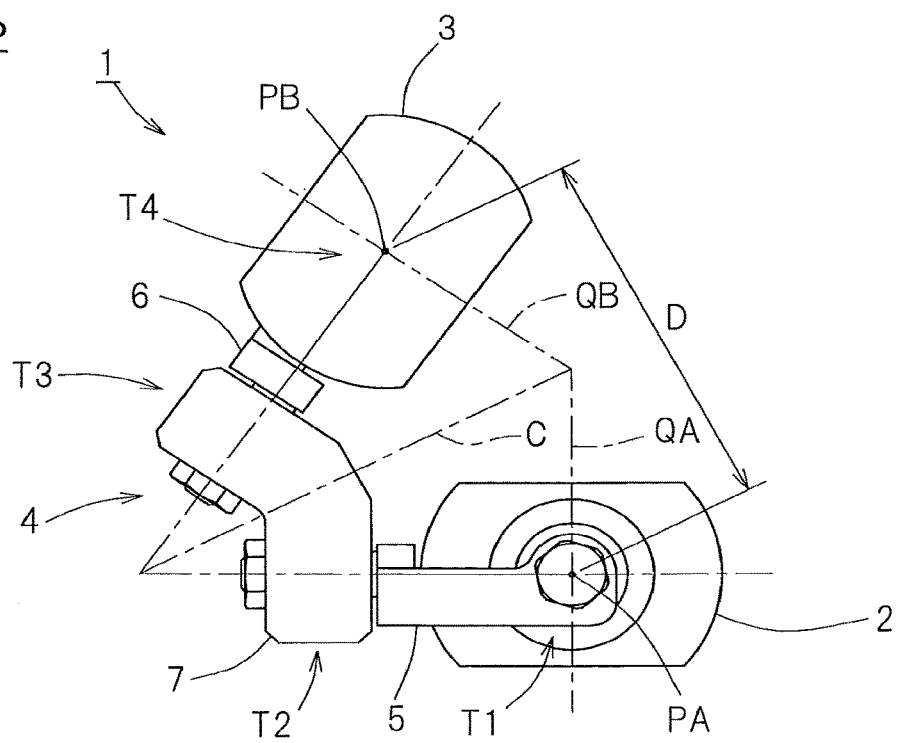
FIG. 2 is a front view showing a different state of the parallel link mechanism, with a portion thereof omitted.

A parallel link mechanism according to a first embodiment of the present invention will be described with reference to FIG. 1 to FIG. 7. FIG. 1 and FIG. 2 are front views respectively showing different states of the parallel link mechanism 1. The parallel link mechanism 1 is of a type in which a distal end side link hub 3 is connected to a proximal end side link hub 2 via three link mechanisms 4 in a position-changeable fashion. In FIG. 1 and FIG. 2, only one link mechanism 4 is shown.

Figure 3:
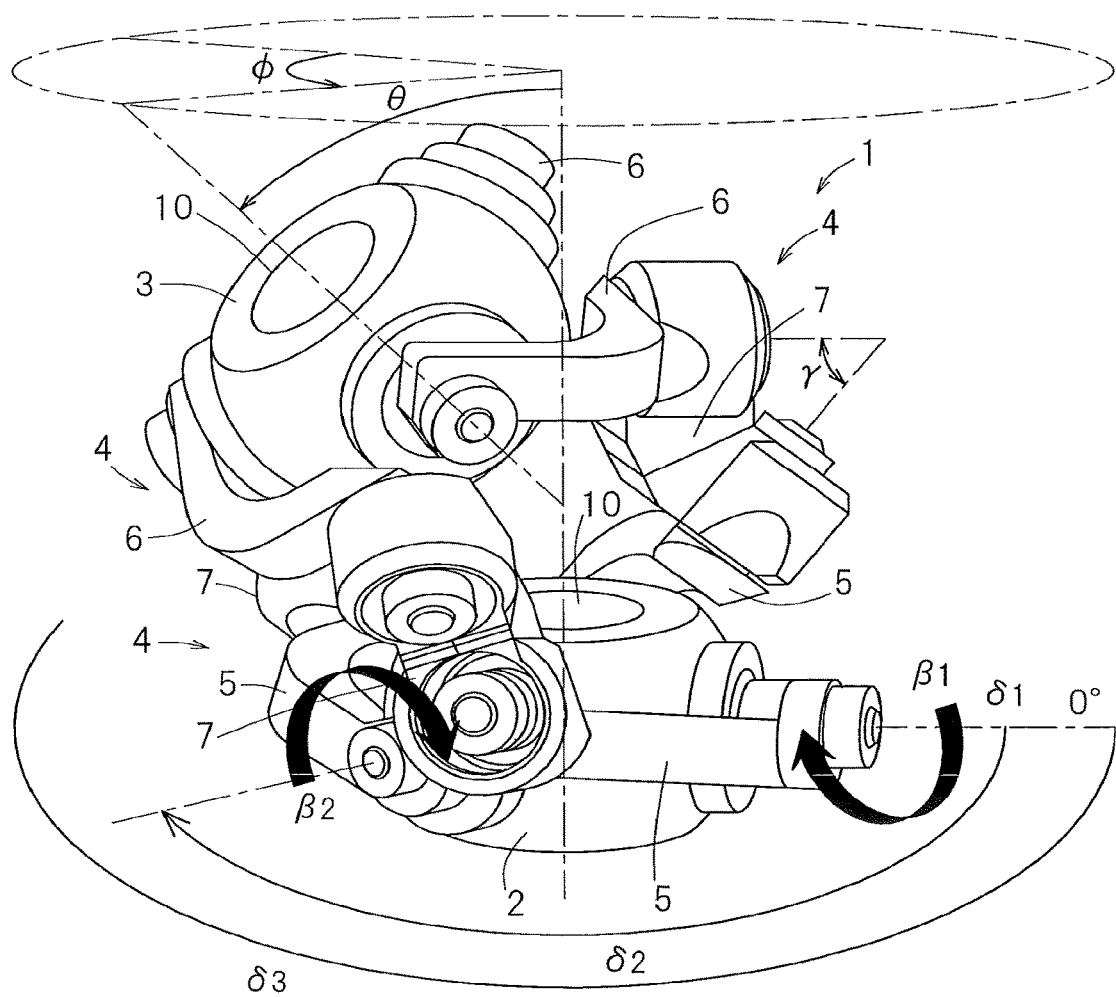
FIG. 3 is a perspective view showing a three-dimensional representation of the parallel link mechanism.

FIG. 3 is a perspective view showing a three-dimensional representation of the parallel link mechanism 1. Each link mechanism 4 includes a proximal side end link member 5, a distal side end link member 6, and an intermediate link member 7, and forms a trinodal link mechanism including four revolute pairs. Each of the proximal side and distal side end link members 5 and 6 has an L-shape. The proximal end portion of the proximal side end link member 5 is pivotably connected to the proximal end side link hub 2, and the proximal end portion of the distal side end link member 6 is pivotably connected to the distal end side link hub 3. The intermediate link member 7 has its opposite ends respectively connected pivotably with the distal end portion of the proximal side end link member 5 and the distal end portion of the distal side end link member 6.

Each of the proximal side and distal side end link members 5 and 6 each has a spherical link structure. The three link mechanisms 4 have common spherical link centers PA and PB (shown in FIG. 1, FIG. 2), and a distance D between the spherical link centers PA and PB is the same among the three link mechanisms 4. The central axis of the revolute pair between the end link member 5 and the intermediate link member 7 and the central axis of the revolute pair between the end link member 6 and the intermediate link member 7 may form an angle or may be parallel to each other.

Figure 4:
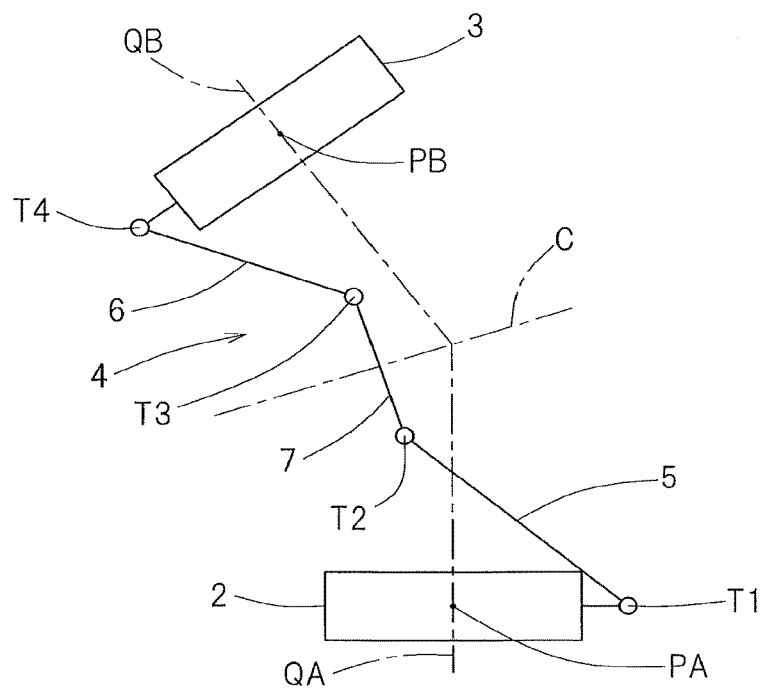
FIG. 4 is a schematic diagram showing one link mechanism depicted in lines of the parallel link mechanism.

The three link mechanisms 4 have a geometrically identical configuration. The geometrically identical configuration means that a geometric model depicted in lines representing the link members 5, 6, and 7, that is, a model depicted with the revolute pairs and lines connecting these revolute pairs, represents a shape in which the proximal end side portion thereof and the distal end side portion thereof are symmetrical with each other with respect to the intermediate portion of the intermediate link member 7. FIG. 4 is a schematic diagram showing one link mechanism 4 represented in lines.

The link mechanism 4 according to this embodiment is of a rotation symmetrical type, and employs a positional structure in which the positional relationship between the proximal end side link hub 2 and the proximal side end link member 5, and the distal end side link hub 3 and the distal side end link member 6, is in rotational symmetry relative to a center line C of the intermediate link member 7. FIG. 1 shows a state where a central axis QA of the proximal end side link hub 2 and a central axis QB of the distal end side link hub 3 are on the same line, and FIG. 2 shows a state where the central axis QB of the distal end side link hub 3 has a predetermined operation angle relative to the central axis QA of the proximal end side link hub 2. Even when the position of each link mechanism 4 changes, the distance D between the spherical link center PA on the proximal end side and the spherical link center PB on the distal end side does not change.

The proximal end side link hub 2, the distal end side link hub 3, and the three link mechanisms 4 cooperatively form a two-degrees-of-freedom mechanism in which the distal end side link hub 3 is movable in two axial directions perpendicular to each other relative to the proximal end side link hub 2. In other words, the mechanism allows the distal end side link hub 3 to rotate with two degrees of freedom to alter its position, relative to the proximal end side link hub 2. This two-degrees-of-freedom mechanism is compact in size, but can realize a wide range of movement of the distal end side link hub 3 relative to the proximal end side link hub 2. For example, the maximum value (maximum bending angle) of a bending angle θ (FIG. 3) between the central axis QA of the proximal end side link hub 2 and the central axis QB of the distal end side link hub 3 can be set to be approximately ±90°. Moreover, a turning angle φ (FIG. 3) of the distal end side link hub 3 relative to the proximal end side link hub 2 can be set within a range of 0° to 360°. The bending angle θ is defined as a vertical angle representing an inclination of the central axis QB of the distal end side link hub 3 relative to the central axis QA of the proximal end side link hub 2. The turning angle φ is defined as a horizontal angle representing an inclination the central axis QB of the distal end side link hub 3 relative to the central axis QA of the proximal end side link hub 2.

Each of the proximal end side link hub 2 and the distal end side link hub 3 is of a doughnut-like shape which has a through-hole 10 formed in a center portion thereof and extending along the axial direction thereof, and an outer periphery of a spherical shape. The proximal side end link members 5 and the distal side end link members 6 are respectively pivotably connected to the outer peripheral faces of the proximal end side link hub 2 and the distal end side link hub 3, at equal intervals in the circumferential direction thereof.

Figure 5:
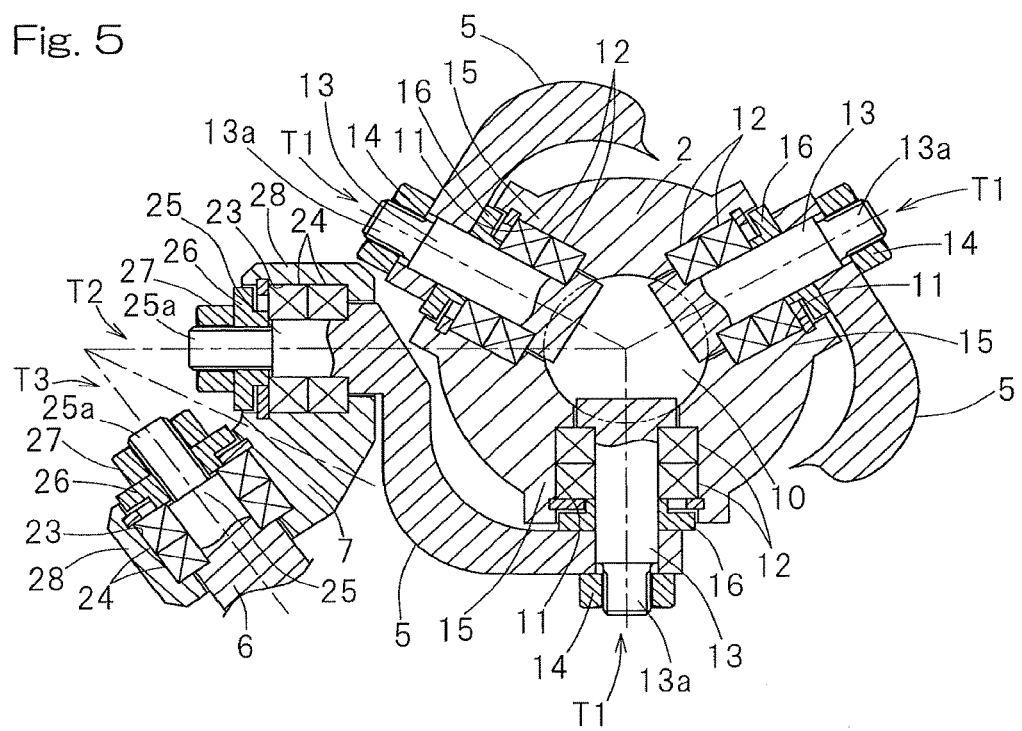
FIG. 5 is a horizontal sectional view showing a proximal end side link hub and the like of the parallel link mechanism.

FIG. 5 is a horizontal sectional view showing the proximal end side link hub 2 and the like, and shows a revolute pair section T1 between the proximal end side link hub 2 and the proximal side end link member 5, a revolute pair section T2 between the proximal side end link member 5 and the intermediate link member 7, and a revolute pair section T3 between the distal side end link member 6 and the intermediate link member 7. With respect to the revolute pair sections T2 and T3, only those of one link mechanism 4 are shown.

In the proximal end side link hub 2, communication holes 11 extending in radial directions are formed at three circumferential locations of the proximal end side link hub 2, each communication hole 11 allowing the through-hole 10 extending in the axial direction to communicate with the outer periphery of the proximal end side link hub 2. Two bearings 12 provided in each communication hole 11 rotatably support a shaft member 13. An outer end portion of each shaft member 13 protrudes from the proximal end side link hub 2, and to the portion protruding therefrom, the proximal side end link member 5 is coupled to be fixed and fastened, together with a spacer member 16, by means of a nut 14 threadedly engaged on a tip end threaded portion 13a. In other words, in the revolute pair section T1, the proximal end side link hub 2 which is one pair constituent member and the proximal side end link member 5 which is the other pair constituent member are pivotably connected to each other via the bearings 12.

A peripheral portion of each communication hole 11 in the proximal end side link hub 2 forms an annular inner face forming portion 15 defined in the claims. In the example shown, the annular inner face forming portion 15 is a part of the link hub 2, but the annular inner face forming portion 15 may be provided separately from the link hub 2. Moreover, the shaft member 13 forms the shaft portion defined in the claims. In the example shown, the shaft member 13 being the shaft portion is provided separately from the end link member 5, but the shaft portion may be provided integrally with the proximal side end link member 5.

Figure 6:
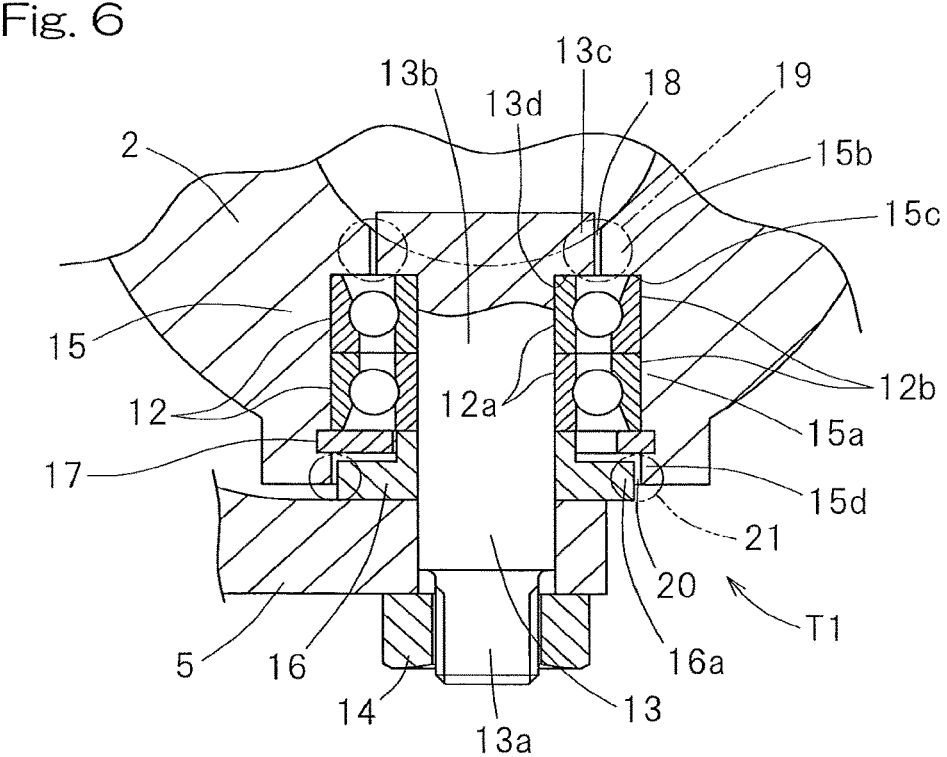
FIG. 6 is an enlarged view of a portion of FIG. 5.

In more detail, as shown in the partial enlarged view of FIG. 6, the two bearings 12 may be angular contact ball bearings and may be arranged in back-to-back relation with each other, for example. The shaft member 13 has an inner end portion in the form of a stepped portion 13c which has an outer diameter greater than that of a portion 13b fitted to the inner periphery of the inner rings 12a of the bearings 12. The stepped portion 13c has a stepped surface 13d abutting against an end face of the inner ring 12a of the bearing 12 on the axially inner side to axially position the inner rings 12a. Moreover, between the inner ring 12a of the bearing 12 on the axially outer side and the end link member 5, the spacer member 16 is provided with its opposite ends in contact with the inner ring 12a and the spacer member 16, respectively. Accordingly, by fastening the nut 14, the inner rings 12a are fastened and fixed with one of the inner rings 12a being urged against the stepped surface 13d via the proximal side end link member 5 and the spacer member 16, and also a preload is applied to the bearings 12. The nut 14 in this example serves as an inner ring fixation element that fixes the position in the axial direction of each inner ring 12a.

The annular inner face forming portion 15 has a portion in the form of a stepped portion 15b having an inner diameter smaller than that of an outer ring fit portion 15a, which is a portion fitted on the outer peripheries of outer rings 12b of the bearings 12. The stepped portion 15b has a stepped surface 15c abutting against an end face of the outer ring 12b of the bearing 12 on the axially inner side to axially position the outer rings 12b. Moreover, the outer ring 12b of the bearing 12 on the axially outer side is prevented from slipping off by a retaining ring 17 mounted to the annular inner face forming portion 15.

The outer peripheral face of the stepped portion 13c of the shaft member 13 and the inner peripheral face of the stepped portion 15b of the annular inner face forming portion 15 confront each other via a small gap 18 in a noncontact manner. Accordingly, a sealing structure 19 is formed to regulate the flow of a lubricant or the like between inside and outside of the bearings 12 while allowing the stepped portion 13c of the shaft member 13 and the stepped portion 15b of the annular inner face forming portion 15 to rotate with respect to each other. That is, by rendering the gap 18 to be narrow, the lubricant inside the bearings 12 is prevented from leaking to the outside, and foreign matter is prevented from entering the inside of the bearings 12 from the outside. The narrower the gap 18 is, the higher the sealing effect is.

The spacer member 16 has an axially outer portion formed with a collar portion 16a extending toward the outer diameter side in such a manner as to circumvent the retaining ring 17. The outer peripheral face of the collar portion 16a and an outer end portion 15d being a part of the annular inner face forming portion 15 confront each other via a small gap 20 in a noncontact manner. Accordingly, a sealing structure 21 is formed to function similarly as described above while allowing the collar portion 16a of the spacer member 16 and the outer end portion 15d of the annular inner face forming portion 15 to rotate with respect to each other. The narrower the gap 20 is, the higher the sealing effect is.

With reference to FIG. 5, the revolute pair section T2 between the proximal side end link member 5 and the intermediate link member 7 has a structure in which two bearings 24 are provided in a communication hole 23 of the intermediate link member 7, and these bearings 24 rotatably support a shaft portion 25 at the distal end of the proximal side end link member 5. In other words, in the revolute pair section T2, the proximal side end link member 5 which is one pair constituent member and the intermediate link member 7 which is the other pair constituent member are pivotably connected to each other via the bearings 24. The bearings 24 are fastened and fixed, via a spacer member 26, by means of a nut 27 threadedly engaged on a tip end threaded portion 25a of the shaft portion 25.

In the example of the revolute pair section T2, a peripheral portion of the communication hole 23 in the intermediate link member 7 is formed as an annular inner face forming portion 28 defined in the claims. In the example shown, the annular inner face forming portion 28 is a part of the intermediate link member 7, but the annular inner face forming portion 28 may be provided separately from the intermediate link member 7. Moreover, in the example shown, the shaft portion 25 is provided integrally with the end link member 5, but the shaft portion 25 may be provided separately from the end link member 5.

Figure 7:
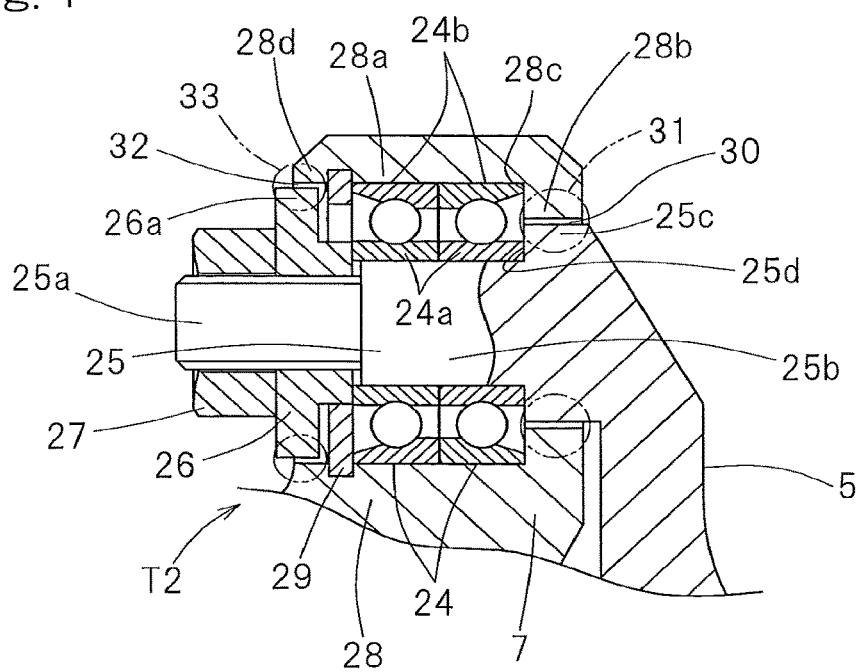
FIG. 7 is an enlarged view of a different portion of FIG. 5.
Figure 8:
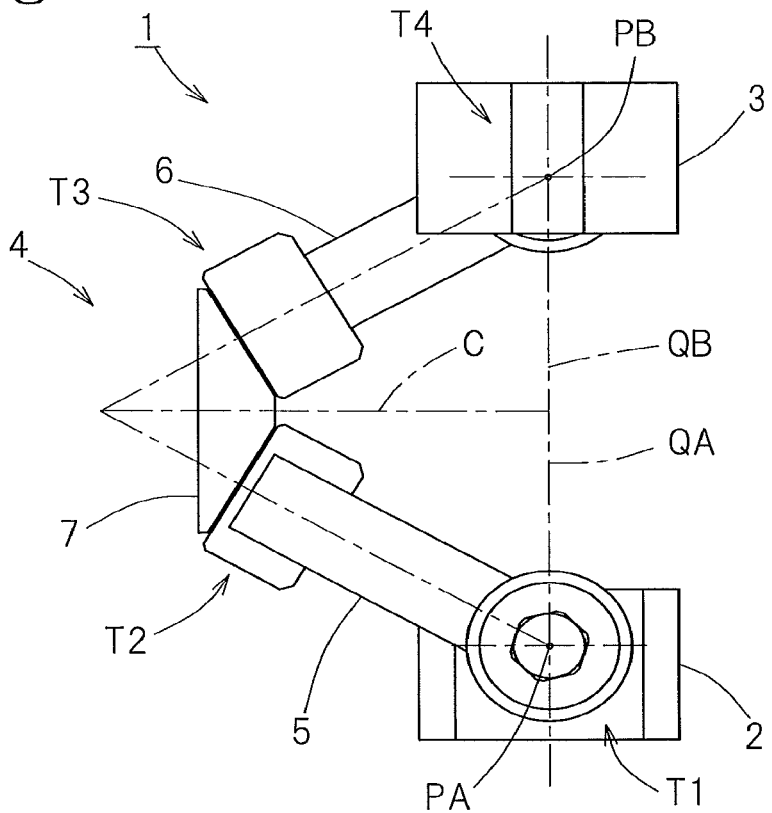
FIG. 8 is a front view showing a parallel link mechanism, with a portion thereof omitted, according to a second embodiment of the present invention.

In more detail, as shown in the partial enlarged view of FIG. 7, the two bearings 24 may be angular contact ball bearings and may be arranged in back-to-back relation with each other, for example. The shaft portion 25 has a base end portion formed with a stepped portion 25c having an outer diameter greater than that of a portion 25b fitted on the inner peripheries of inner rings 24a of the bearings 24. The stepped portion 25c has a stepped surface 25d abutting against an end face of the inner ring 24a of the bearing 24 on the proximal end side to axially position the inner rings 24a. Moreover, the inner ring 24a of the bearing 24 on the distal end side is in contact with the spacer member 26. Therefore, by fastening the nut 27, the inner rings 24a are fastened and fixed with one of the inner rings 24a being urged against the stepped surface 25d via the spacer member 26, and also a preload is applied to the bearings 24. The nut 27 serves as an inner ring fixation element which fixes the position in the axial direction of each inner ring 24a.

The annular inner face forming portion 28 has a portion formed as a stepped portion 28b having an inner diameter smaller than that of an outer ring fit portion 28a, which is a portion fitted on the outer peripheries of outer rings 24b of the bearings 24. The stepped portion 28b has a stepped surface 28c abutting against an end face of the outer ring 24b of the bearing 24 on the proximal end side to axially position the outer rings 24b. Moreover, the outer ring 24b of the bearing 24 on the distal end side is prevented from slipping off by a retaining ring 29 mounted on the annular inner face forming portion 28.

The outer peripheral face of the stepped portion 25c of the shaft portion 25 and the inner peripheral face of the stepped portion 28b of the annular inner face forming portion 28 confront each other via a small gap 30 in a noncontact manner. Accordingly, a sealing structure 31 is formed to regulate the flow of a lubricant or the like between inside and outside of the bearings 24 while allowing the stepped portion 25c of the shaft portion 25 and the stepped portion 28b of the annular inner face forming portion 28 to rotate with respect to each other. In this way, by rendering the gap 30 to be narrow, the lubricant inside the bearings 24 is prevented from leaking to the outside, and foreign matter is prevented from entering the inside of the bearings 24 from the outside. The narrower the gap 30 is, the higher the sealing effect is.

The spacer member 26 has an axial end side portion formed with a collar portion 26a extending toward the outer diameter side in such a manner as to circumvent the retaining ring 29. The outer peripheral face of the collar portion 26a and a distal end portion 28d being a part of the annular inner face forming portion 28 confront each other via a small gap 32 in a noncontact manner. Accordingly, a sealing structure 33 is formed to function similarly as described above while allowing the collar portion 26a of the spacer member 26 and the distal end portion 28d of the annular inner face forming portion 28 to rotate with respect to each other. The narrower the gap 32 is, the higher the sealing effect is.

In the above, the revolute pair section T1 between the proximal end side link hub 2 and the proximal side end link member 5, and the revolute pair section T2 between the proximal side end link member 5 and the intermediate link member 7 have been described. Although detailed description is omitted, the revolute pair section T4 between the distal end side link hub 3 and the distal side end link member 6 has the same structure as that of the revolute pair section T1, and the revolute pair section T3 between the distal side end link member 6 and the intermediate link member 7 has the same structure as that of the revolute pair section T2.

As described above, by employing the structure in which the bearings 12, 24 are provided in the four revolute pair sections T1 to T4 in each link mechanism 4, the frictional resistance in each revolute pair can be reduced, whereby the rotational resistance can be relieved. Accordingly, a smooth power transmission can be secured, and also the durability thereof can be increased.

In the structure provided with the bearings 12, 24, by applying a preload to the bearings 12, 24, a radial clearance and a thrust clearance are eliminated and rattling of the revolute pair can be suppressed. Accordingly, difference in rotation phase between the proximal end side link hub 2 side and the distal end side link hub 3 side is eliminated, constant velocity can be maintained, and occurrence of vibration and abnormal sound can be suppressed. In particular, by rendering the bearing clearance in each bearing 12, 24 to be a negative clearance, backlash between an input and an output can be reduced.

As the bearing 12, 24, an angular contact ball bearing may be used, for example. An angular contact ball bearing is a bearing having a small size and a high rigidity, and thus, is most appropriate for the bearing 12, 24 which is disposed in the revolute pair sections T1 to T4 of the parallel link mechanism 1 which receives a moment load and which is required to have a compact configuration. Conventionally, standard small angular contact ball bearings with seals have been rarely available, and thus, are difficult to be used in a parallel link mechanism. However, by constructing the sealing structures of the present invention, it becomes possible to use small angular contact ball bearings. Depending on the case, a ball bearing of a type other than the angular contact ball bearing may be used, or a roller bearing may be used.

By providing each bearing 12 embedded in the annular inner face forming portion 15 of the proximal end side link hub 2 and the distal end side link hub 3, without enlarging the external shape of the entirety of the parallel link mechanism 1, the external dimensions of each of the proximal end side link hub 2 and the distal end side link hub 3 can be increased. Accordingly, the mounting space for mounting the proximal end side link hub 2 and the distal end side link hub 3 to other members can be easily secured.

In the revolute pair section T1 (T4) between the proximal end side link hub 2 (the distal end side link hub 3) and the proximal side end link member 5 (the distal side end link member 6), on one side in the axial direction of the bearings 12, the sealing structure 19 is formed cooperatively by the shaft member 13 provided in the proximal side end link member 5 (the distal side end link member 6) which is one pair constituent member of the revolute pair, and the annular inner face forming portion 15 provided in the proximal end side link hub 2 (the distal end side link hub 3) which is the other pair constituent member of the revolute pair; and on the other side in the axial direction, the sealing structure 21 is constructed by the spacer member 16 fitted on the outer periphery of the shaft member 13 and the annular inner face forming portion 15.

The proximal end side link hub 2 (the distal end side link hub 3) and the proximal side end link member 5 (the distal side end link member 6) are components forming the parallel link mechanism 1. Further, the spacer member 16 is a component generally provided between the inner rings 12a and the nut 14 such that a load is uniformly applied to the inner rings 12a when the inner rings 12a of the bearings 12 are to be fastened and fixed with the nut 14 being the inner ring fixation element. Therefore, by forming the sealing structures 19 and 21 only with components generally used, there is no need to provide seals implemented by other members, and thus, increase of the width dimension of each bearing 12 can be suppressed. Accordingly, interference between components of each link mechanism 4 is less likely to occur, and thus, the work range is expanded. In addition, since the dimensions of the periphery of each bearing 12 are reduced, the parallel link mechanism 1 as a whole can be made light in weight and compact in size.

In consideration of assemblability or the like, it may be difficult to form the sealing structures at both ends of the bearings 12 by only using the shaft member 13 and the annular inner face forming portion 15. However, by also using a sealing structure using the spacer member 16 and the annular inner face forming portion 15, the sealing structures 19 and 21 can be easily constructed at both ends of the bearings 24.

With respect to the revolute pair section T2 (T3) between the proximal side end link member 5 (the distal side end link member 6) and the intermediate link member 7, on one side in the axial direction of the bearings 24, the sealing structure 31 is constructed by the shaft portion 25 provided in the proximal side end link member 5 (the distal side end link member 6) being one pair constituent member of the revolute pair, and the annular inner face forming portion 28 provided in the intermediate link member 7 being the other pair constituent member of the revolute pair; and on the other side in the axial direction, the sealing structure 33 is formed by the spacer member 26 fitted on the outer periphery of the shaft portion 25 and the annular inner face forming portion 28.

Similarly to the above, by forming the sealing structures 31 and 33 only with generally used components, there is no need to provide seals implemented by other members, and thus, increase of the width dimension of each bearing 24 can be suppressed. Accordingly, interference between components of each link mechanism 4 is less likely to occur, and thus, the working range is expanded. In addition, since the dimensions of the periphery of each bearing 24 are reduced, the parallel link mechanism 1 as a whole can be made light in weight and compact in size.

In consideration of assemblability or the like, it may be difficult to form the sealing structures at both ends of the bearings 24 by only using the shaft portion 25 and the annular inner face forming portion 28. However, by also using a sealing structure using the spacer member 26 and the annular inner face forming portion 28, the sealing structures 31 and 33 can be easily constructed at both ends of the bearings 24.

In more detail, the sealing structure 19 (FIG. 6) is defined in the form of the gap 18 between the outer peripheral face of the stepped portion 13c being a part of the shaft member 13 and the inner peripheral face of the stepped portion 15b being a part of the annular inner face forming portion 15. The stepped portion 13c of the shaft member 13 is used for positioning of the inner rings 12a and the stepped portion 15b of the annular inner face forming portion 15 is used for positioning of the outer rings 12b. Since the stepped portions 13c and 15b are at a short distance from each other, the sealing structure 19 can be easily constructed in the form of the gap 18, without providing additional members.

The sealing structure 21 (FIG. 6) is defined in the form of the gap 20 between the outer peripheral face of the collar portion 16a being a part of the spacer member 16 and the inner peripheral face of the outer end portion 15d being a part of the annular inner face forming portion 15. The spacer member 16 is used for fastening and fixing the inner rings 12a and the outer end portion 15d of the annular inner face forming portion 15 is used for retaining the retaining ring 17. By providing the collar portion 16a in the spacer member 16 to shorten the distance between the outer peripheral face of the collar portion 16a and the inner peripheral face of the outer end portion 15d of the annular inner face forming portion 15, the sealing structure 21 can be easily constructed in the form of the gap 20, without providing additional members.

The sealing structure 31 (FIG. 7) is defined in the form of the gap 30 between the outer peripheral face of the stepped portion 25c being a part of the shaft portion 25 and the inner peripheral face of the stepped portion 28b being a part of the annular inner face forming portion 28. The stepped portion 25c of the shaft portion 25 is used for positioning of the inner rings 24a and the stepped portion 28b of the annular inner face forming portion 28 is used for positioning of the outer rings 24b. Since the stepped portions 25c and 28b are at a short distance from each other, the sealing structure 31 can be easily constructed in the form of the gap 30, without providing additional members.

The sealing structure 33 (FIG. 7) is defined in the form of the gap 32 between the outer peripheral face of the collar portion 26a being a part of the spacer member 26 and the inner peripheral face of the outer end portion 28d being a part of the annular inner face forming portion 28. The spacer member 26 is used for fastening and fixing the inner rings 24a, and the outer end portion 28d of the annular inner face forming portion 28 is used for retaining the retaining ring 29. By providing the collar portion 26a in the spacer member 26 to shorten the distance between the outer peripheral face of the collar portion 26a and the inner peripheral face of the outer end portion 28d of the annular inner face forming portion 28, the sealing structure 33 can be easily constructed in the form of the gap 32, without providing additional members.

Figure 9:
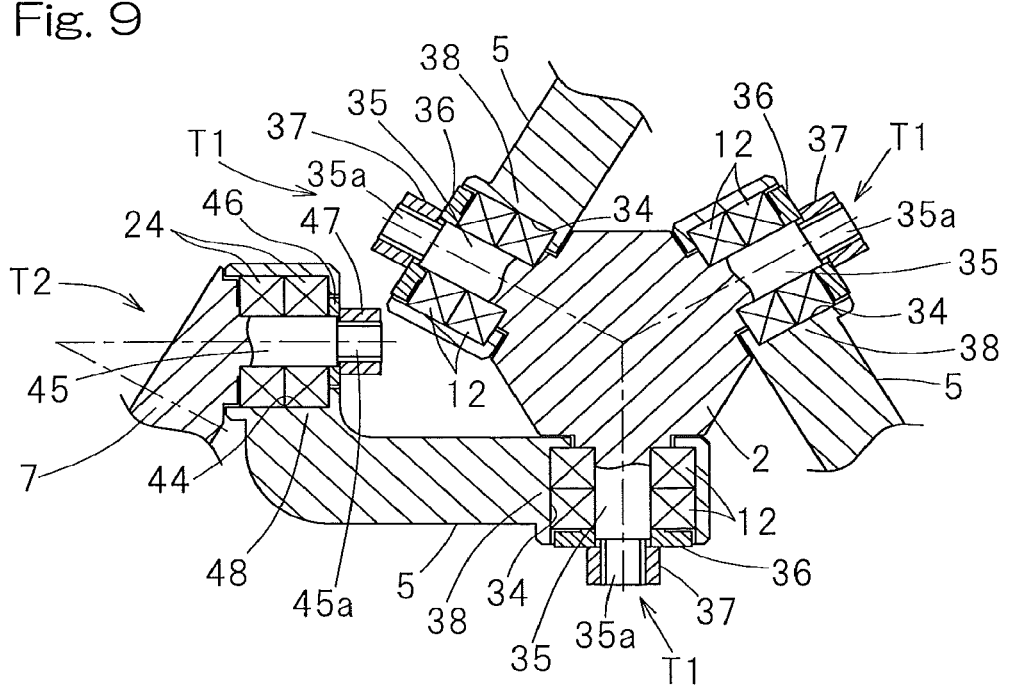
FIG. 9 is a horizontal sectional view of a proximal end side link hub and the like of the parallel link mechanism.

FIGS. 8 to 11 show a second embodiment of the present invention, in which a different type of the parallel link mechanism is used. This parallel link mechanism 1 has the bearings 12 (FIG. 9), of an outer ring rotation type, which rotatably support each end link member 5 relative to the proximal end side link hub 2 and each end link member 6 relative to the distal end side link hub 3. Now, description is made with respect to the revolute pair section T1 between the proximal end side link hub 2 and the proximal side end link member 5 as an example. As shown in FIG. 9, the proximal end side link hub 2 has shaft portions 35 formed at three circumferential locations thereof. On the outer periphery of each shaft portion 35, the end link member 5 is rotatably supported via the two bearings 12 juxtaposed to each other. The two bearings 12 are provided in a communication hole 34 formed in the end link member 5, and are fastened and fixed, via a spacer member 36, by means of a nut 37 threadedly engaged on a tip end threaded portion 35a of the shaft portion 35.

In the case of the revolute pair section T1, a peripheral portion of the communication hole 34 in the end link member 5 is an annular inner face forming portion 38 defined in the claims. In the example shown, the annular inner face forming portion 38 is formed as a part of the end link member 5, but the annular inner face forming portion 38 may be provided separately from the end link member 5. Further, in the example shown, the shaft portion 35 is provided integrally with the link hub 2, the shaft portion 35 may be provided separately from the link hub 2.

Figure 10:
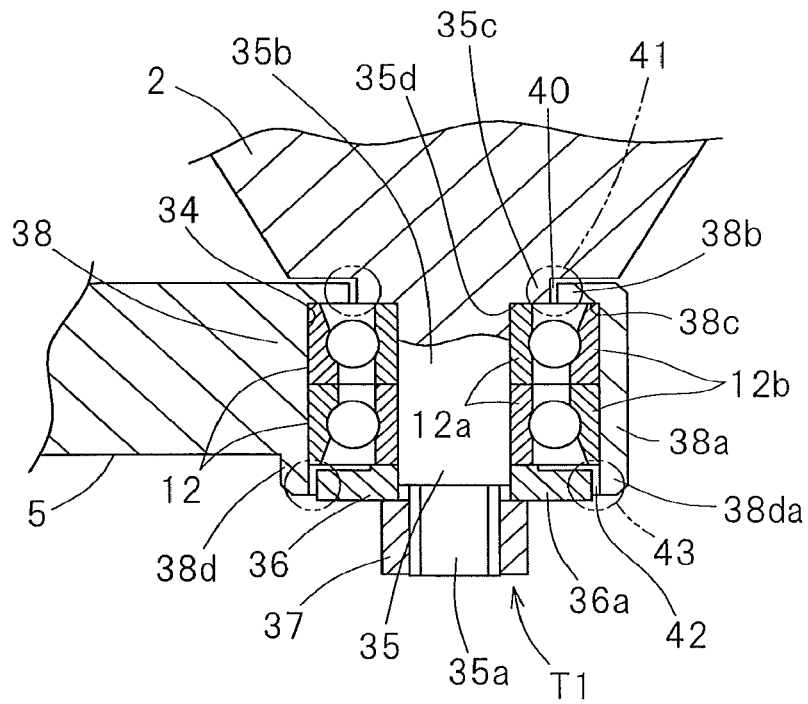
FIG. 10 is an enlarged view of a portion of FIG. 9.

In more detail, as shown in the partial enlarged view of FIG. 10, the two bearings 12 may be angular contact ball bearings and may be arranged in back-to-back relation with each other, for example. The shaft portion 35 has a base end portion formed with a stepped portion 35c having an outer diameter greater than that of a portion 35b fitted to the inner peripheries of the inner rings 12a of the bearings 12. The stepped portion 35c has a stepped surface 35d abutting against an end face of the inner ring 12a of the bearing 12 on the proximal end side to axially position the inner rings 12a. Moreover, the inner ring 12a of the bearing 12 on the distal end side is in contact with the spacer member 36. Therefore, by fastening the nut 37, the inner rings 12a are fastened and fixed with one of the inner rings 12a being urged against the stepped surface 35d via the spacer member 36, and also a preload is applied to the bearings 12. The nut 37 serves as an inner ring fixation element which fixes the position in the axial direction of each inner ring 12a.

The annular inner face forming portion 38 has a portion formed as a stepped portion 38b having an inner diameter smaller than that of an outer ring fit portion 38a, which is a portion fitted on the outer peripheries of the outer rings 12b of the bearings 12. The stepped portion 38b has a stepped surface 38c abutting against an end face of the outer ring 12b of the bearing 12 on the proximal end side to axially position the outer rings 12b. Moreover, the end link member 5 has a collar portion 38d of an annular shape, protruding from a side face of the end link member 5 and having a base end forming a part of the outer ring fit portion 38a. In a state where the outer rings 12b are fitted to the outer ring fit portion 38a, by crimping the collar portion 38d toward the inner diameter side, the outer rings 12b are brought into a tight fit. Alternatively, the collar portion 38d may have a tip end portion 38da protruding beyond the outer ring 12b that has a base end engaging with an end face of an outer ring 12b to position the outer rings 12b between the stepped portion 38b and the crimped portion, while preventing from slipping off in the axial direction.

The outer peripheral face of the stepped portion 35c of the shaft portion 35 and the inner peripheral face of the stepped portion 38b of the annular inner face forming portion 38 confront each other via a small gap 40 in a noncontact manner. Accordingly, a sealing structure 41 is formed to regulate the flow of a lubricant or the like between inside and outside of the bearings 12 while allowing the stepped portion 35c of the shaft portion 35 and the stepped portion 38b of the annular inner face forming portion 38 to rotate with respect to each other. That is, by rendering the gap 40 to be narrow, the lubricant inside the bearings 12 is prevented from leaking to the outside, and foreign matter is prevented from entering the inside of the bearings 12 from the outside. The narrower the gap 40 is, the higher the sealing effect is.

The spacer member 36 has an axial end side portion formed with a collar portion 36a extending toward the outer diameter side in such a manner as to circumvent the outer ring 12b. The outer peripheral face of the collar portion 36a and the inner peripheral face of the distal end portion 38da which is a part of the annular inner face forming portion 38 confront each other via a small gap 42 in a noncontact manner. Accordingly, a sealing structure 43 is formed to function similarly as described above while allowing the collar portion 36a of the spacer member 36 and the distal end portion 38da of the annular inner face forming portion 38 to rotate with respect to each other. The narrower the gap 42 is, the higher the sealing effect is.

With reference to FIG. 9, the revolute pair section T2 between the proximal side end link member 5 and the intermediate link member 7 has a structure in which the two bearings 24 are provided in a communication hole 44 of the proximal side end link member 5, and these bearings 24 rotatably support a shaft portion 45 of the intermediate link member 7. In other words, in the revolute pair section T2, the proximal side end link member 5 which is one pair constituent member and the intermediate link member 7 which is the other pair constituent member are pivotably connected to each other via the bearings 24. The bearings 24 are fastened and fixed, via a spacer member 46, by means of a nut 47 threadedly engaged on a distal end threaded portion 45a of the shaft portion 45.

A peripheral portion of the communication hole 44 in the proximal side end link member 5 forms an annular inner face forming portion 48 defined in the claims. In the example shown, the annular inner face forming portion 48 is a part of the proximal side end link member 5, but the annular inner face forming portion 48 may be provided separately from the end link member 5. Moreover, in the example shown, the shaft portion 45 is provided integrally with the intermediate link member 7, but the shaft portion 45 may be provided separately from the intermediate link member 7.

Figure 11:
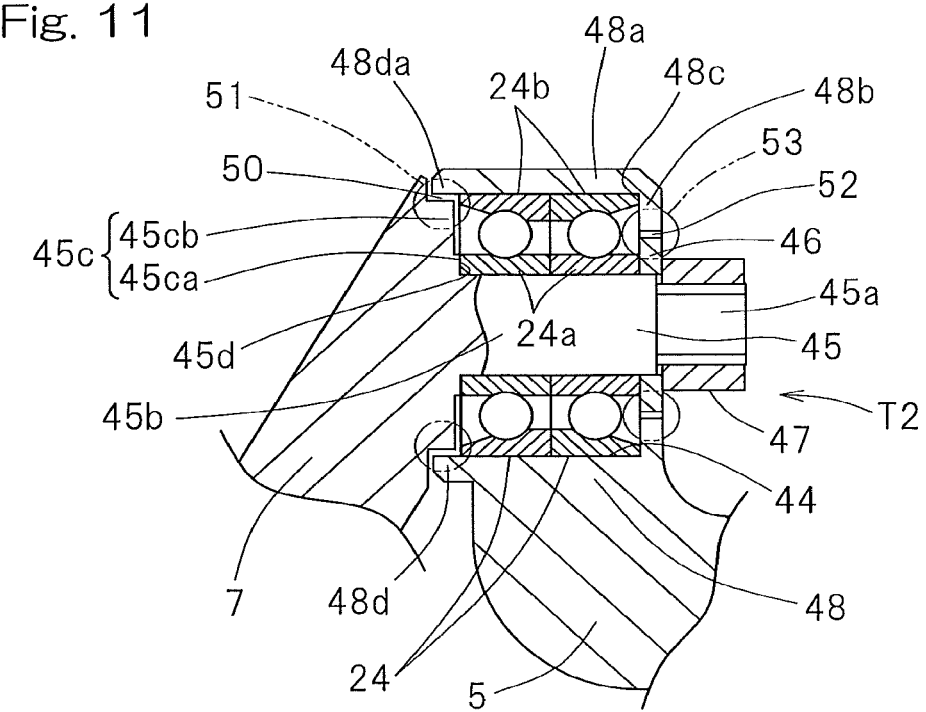
FIG. 11 is an enlarged view of a different portion of FIG. 9.

In more detail, as shown in the partial enlarged view of FIG. 11, the two bearings 24 may be angular contact ball bearings and may be arranged in back-to-back relation with each other, for example. The shaft portion 45 has a base end portion formed with a stepped portion 45c having an outer diameter greater than that of a portion 45b fitted on the inner peripheries of the inner rings 24a of the bearings 24. The stepped portion 45c has two-step shoulders 45ca and 45cb. The first shoulder 45ca has a stepped surface 45d abutting against an end face of the inner ring 24a of the bearing 24 on the base end side to axially position the inner rings 24a. The second shoulder 45cb may be provided as a separate member. For example, the second shoulder 45cb may be provided as a ring member, having an inner peripheral face fitted on the outer peripheral face of the first shoulder 45ca, whereby the shoulder 45cb may be fixed. The inner ring 24a of the bearing 24 on the tip end side is in contact with the spacer member 46. Accordingly, by fastening the nut 47, the inner rings 24a are fastened and fixed with one of the inner rings 24a being urged against the stepped surface 45d via the spacer member 46, and also a preload is applied to the bearings 24. The nut 47 is inner ring fixation element which fixes the position in the axial direction of each inner ring 24a.

The annular inner face forming portion 48 has a portion formed as a stepped portion 48b having an inner diameter smaller than that of an outer ring fit portion 48a, which is a portion fitted on the outer peripheries of the outer rings 24b of the bearings 24. The stepped portion 48b has a stepped surface 48c abutting against an end face of the outer ring 24b of the bearing 24 on the tip end side to axially position the outer rings 24b. Moreover, the proximal side end link member 5 has a collar portion 48d of an annular shape protruding from a side face of the proximal side end link member 5 and having a base end forming a part of the outer ring fit portion 48a. In a state where the outer rings 24b are fitted on the outer ring fit portion 48a, by crimping the collar portion 48d toward the inner diameter side, the outer rings 24b are brought into a tight fit. Alternatively, the collar portion 48d may have a distal end portion 48da protruding beyond the outer ring 24b and having a base end engaging with an end face of an outer ring 24b to position the outer rings 24b between the stepped portion 48b and the crimped portion, while preventing from slipping off in the axial direction.

The outer peripheral face of the stepped portion 45c of the shaft portion 45 and the inner peripheral face of the distal end portion 48da of the annular inner face forming portion 48 confront each other via a small gap 50 in a noncontact manner. Accordingly, a sealing structure 51 is formed to regulate the flow of a lubricant or the like between inside and outside of the bearings 24 while allowing the stepped portion 45c of the shaft portion 45 and the distal end portion 48da of the annular inner face forming portion 48 to rotate with respect to each other. That is, by rendering the gap 50 to be narrow, the lubricant inside the bearings 24 is prevented from leaking to the outside, and foreign matter is prevented from entering the inside of the bearings 24 from the outside. The narrower the gap 50 is, the higher the sealing effect is.

The outer peripheral face of the spacer member 46 and the inner peripheral face of the stepped portion 48b of the annular inner face forming portion 48 confront each other via a small gap 52 in a noncontact manner. Accordingly, a sealing structure 53 is formed to function similarly as described above, while allowing the spacer member 46 and the stepped portion 48b of the annular inner face forming portion 48 to rotate with respect to each other. The narrower the gap 52 is, the higher the sealing effect is.

In the above, description has been made with respect to the revolute pair section T1 between the proximal end side link hub 2 and the proximal side end link member 5, and the revolute pair section T2 between the proximal side end link member 5 and the intermediate link member 7. Although detailed description is omitted, the revolute pair section T4 between the distal end side link hub 3 and the distal side end link member 6 has the same structure as that of the revolute pair section T1, and the revolute pair section T3 between the distal side end link member 6 and the intermediate link member 7 has the same structure as that of the revolute pair section T2. Thus, by employing the structure in which the bearings 12, 24 are provided in the four revolute pair sections T1 to T4 in each link mechanism 4, the same operations and effects as those in the first embodiment can be obtained.

Figure 12:
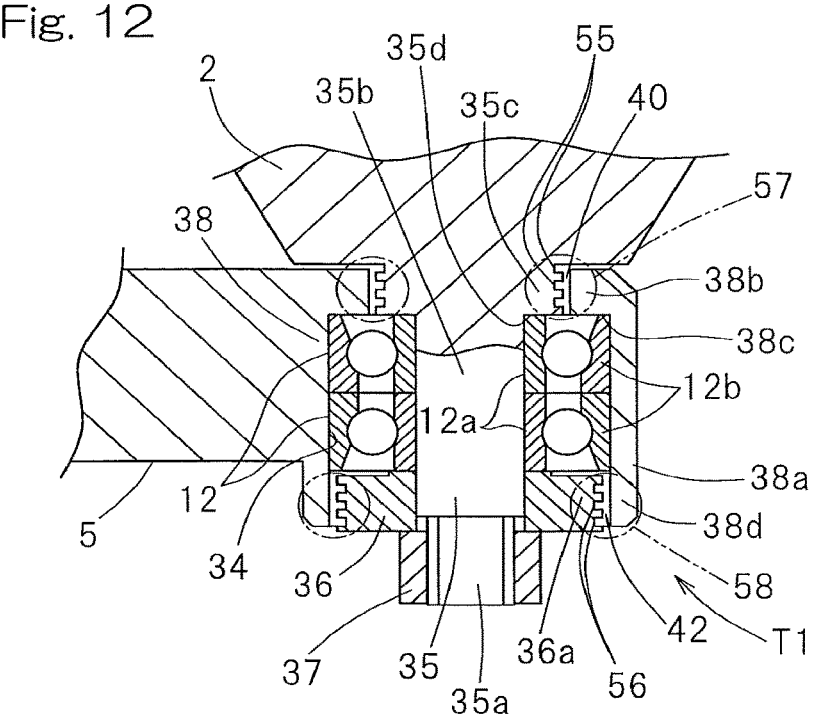
FIG. 12 is an enlarged cross-sectional view showing a different example of a sealing structure.

FIG. 12 shows a different example of the sealing structures. This sealing structure is applied to the revolute pair section T1 (T4) between the proximal end side link hub 2 (the distal end side link hub 3) and the proximal side end link member 5 (the distal side end link member 6) of the second embodiment described with reference to FIG. 8 to FIG. 11. In this sealing structure, the outer peripheral face of the stepped portion 35c of the shaft portion 35 and the outer peripheral face of the collar portion 36a of the spacer member 36 are respectively provided with a plurality of grooves 55 and 56 extending along the circumferential direction. Accordingly, each sealing structure 57, 58 includes a labyrinth sealing structure, and thus, sealing ability is further increased than in the sealing structure 41, 42 using only the gap 40, 42 (FIG. 10). This sealing structure may be applied to the revolute pair section T2 (T3) between the proximal side end link member 5 (the distal side end link member 6) and the intermediate link member 7. Further, this sealing structure may be applied to the revolute pair sections T1 to T4 of the first embodiment described with reference to FIG. 1 to FIG. 7.

Figure 13:
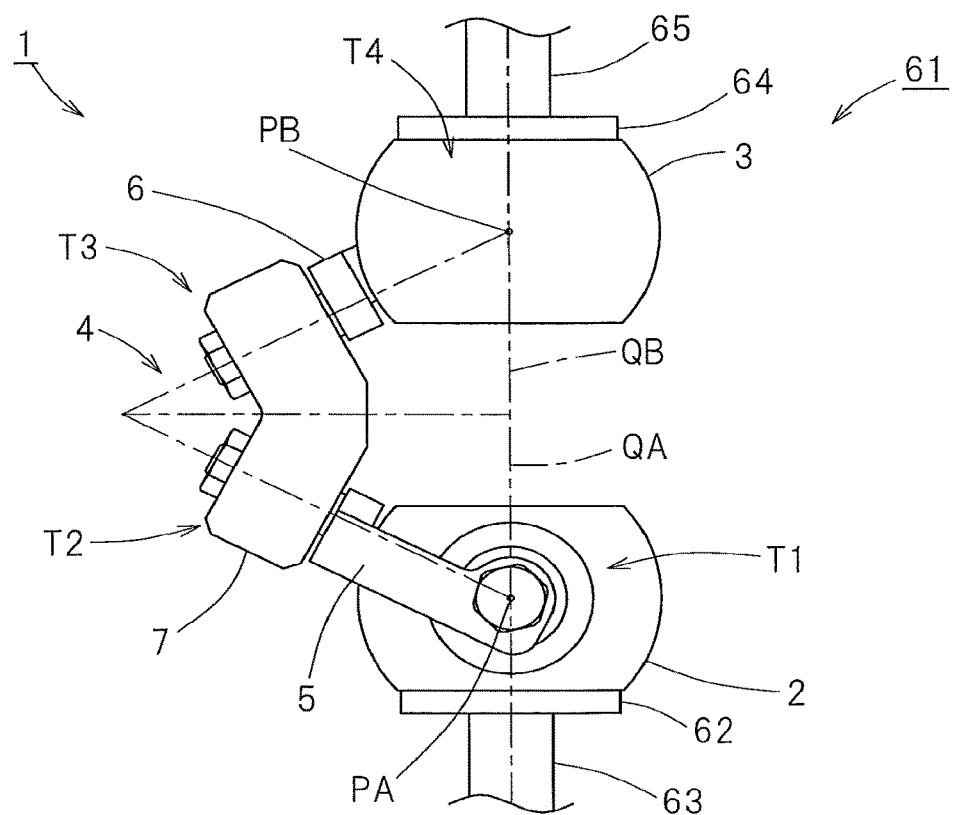
FIG. 13 is a front view of a constant velocity universal joint, with a portion thereof omitted, according to a third embodiment of the present invention.

FIG. 13 shows a constant velocity universal joint according to a third embodiment of the present invention, which uses a parallel link mechanism. This constant velocity universal joint 61 is of a type in which an input shaft 63 is mounted via a mounting plate 62 to the proximal end side link hub 2 of the parallel link mechanism 1 shown in FIG. 1 to FIG. 7 and an output shaft 65 is mounted via a mounting plate 64 to the distal end side link hub 3 thereof. The axes of the input shaft 63 and the output shaft 65 are respectively aligned with the central axis QA of the proximal end side link hub 2 and the central axis QB of the proximal end side link hub 3.

With respect to the parallel link mechanism 1, in a case where the angles and the lengths of the shaft members 13 (FIG. 5) in the proximal end side link hub 2 and the output side link hub 3 are identical with each other, the geometrical shapes of the proximal side end link member 5 and the distal side end link member 6 are identical with each other, and the shapes at the proximal end side and the distal end side of the intermediate link member 7 are identical with each other, it is assumed that the angular positional relationship between the intermediate link member 7 and the proximal side end link member 5 and the angular positional relationship between the intermediate link member 7 and the distal side end link member 6 are rendered to be identical with each other relative to the symmetry plane of the intermediate link member 7, between the proximal end side and the distal end side. Then, due to geometric symmetry, the proximal end side link hub 2 and the proximal side end link member 5, and the distal end side link hub 3 and the distal side end link member 6 will move in the same manner. As in the case of this example, when the input shaft 63 and the output shaft 65 are provided in the proximal end side and distal end side link hubs 2 and 3 in a manner coaxial with the central axes QA and QB, respectively, and rotation transmission is made from the proximal end side to the distal end side, the input shaft 63 and the output shaft 65 will have the same rotation angle and rotate at an equal speed. The symmetry plane of the intermediate link member 7 at the time of the constant speed rotation is known as a constant velocity bisecting plane.

Therefore, by arranging a plurality of the link mechanisms 4 having the same geometric shape and commonly using the proximal end side link hub 2 and the distal end side link hub 3, on the circumferences thereof, as positions that allow compatible movement of the plurality of the link mechanisms 4, the intermediate link members 7 are limited to move on their respective constant velocity bisecting planes. Accordingly, even when the proximal end side and the distal end side assume any operation angle, the input shaft 63 and the output shaft 65 rotate at a constant speed.

Figure 14:
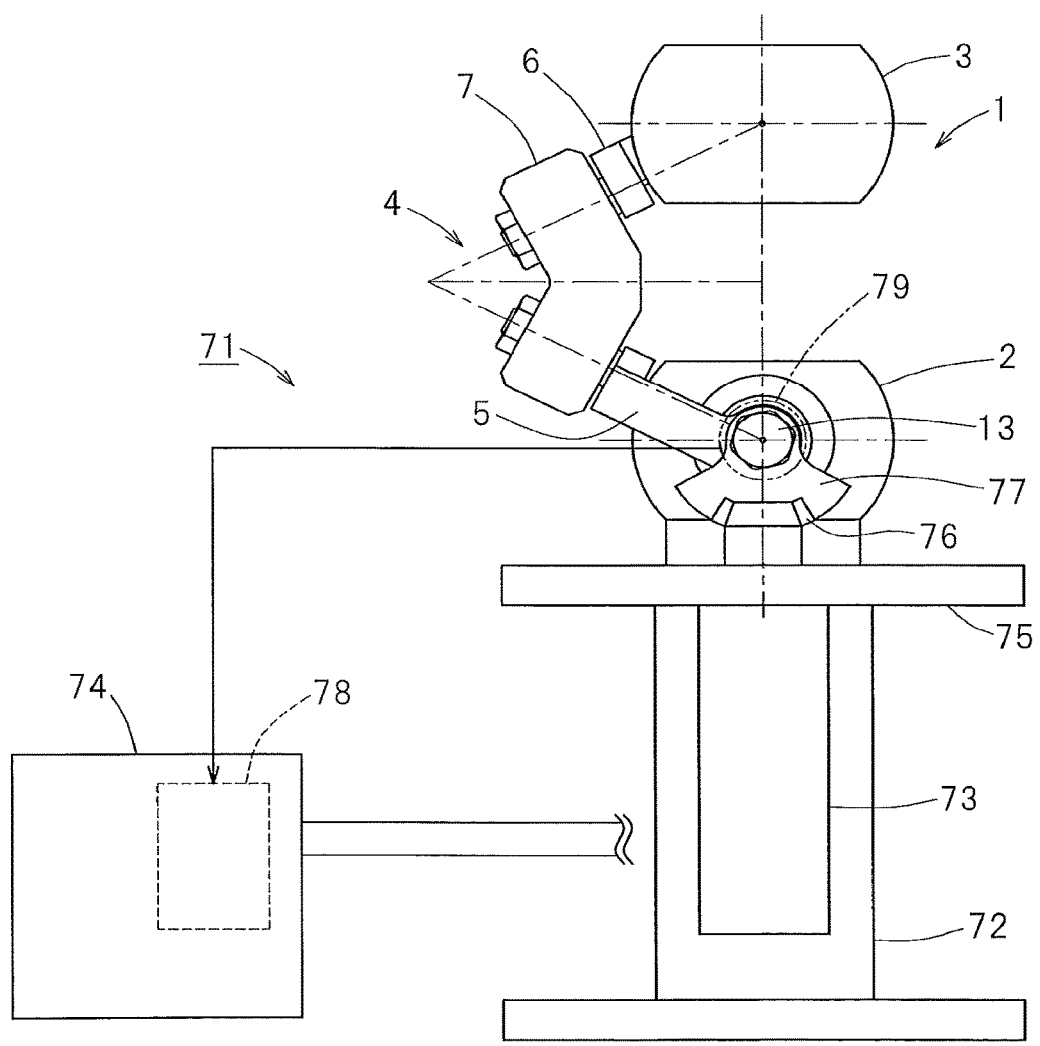
FIG. 14 is a front view of a link actuator, with a portion thereof omitted, according to a fourth embodiment of the present invention.

FIG. 14 shows a link actuator according to a fourth embodiment of the present invention, which uses a parallel link mechanism. This link actuator 71 includes: the parallel link mechanism 1 shown in FIG. 1 to FIG. 7; a base 72 which supports the parallel link mechanism 1; two or more position changing actuators 73 which activate the parallel link mechanism 1; and a controller 74 which operates those position changing actuators 73.

The base 72 is of a shape elongated in the vertical direction, and on the top face thereof, the proximal end side link hub 2 of the parallel link mechanism 1 is fixed. On the outer periphery of an upper portion of the base 72, a drive source mounting board 75 having a collar shape is provided. The position changing actuators 73 are secured to the drive source mounting board 75 so as to be suspended therefrom. The number of the position changing actuators 73 is two, for example. Each position changing actuator 73 may be comprised of a rotary actuator. A bevel gear 76 mounted on the output shaft of the position changing actuator 73 is meshed with a bevel gear 77 having a sector shape mounted on the shaft member 13 (FIG. 5) of the proximal end side link hub 2.

In the link actuator 71, the controller 74 is operated to drive each position changing actuator 73 to rotate, to thereby actuate the parallel link mechanism 1. Specifically, when the position changing actuator 73 is driven to rotate, its rotation is transmitted to the shaft member 13 via a pair of the bevel gears 76 and 77, to thereby change the angle of the proximal side end link member 5 relative to the proximal end side link hub 2. In this way, the position and position of the distal end side link hub 3 is determined. The reason why the number of the link mechanisms 4 to which the position changing actuators 73 are respectively provided is two or more is that two or more position changing actuators 73 are necessary in order to determine the location and position of the distal end side link hub 3 relative to the proximal end side link hub 2. The position changing actuators 73 may be provided to all of the three link mechanisms 4.

The rotation drive of the position changing actuator 73 for actuating the parallel link mechanism 1 may be manually performed by using a manipulation tool (not shown) provided in the controller 74, or may be automatically controlled by a control device 78 to attain a set amount defined by a setting instrument (not shown) provided in the controller 74. The control device 78 may be provided within the controller 74 or may be provided outside the controller 74.

In a case where the automatic control is performed, a control target value of a rotation angle βn of the proximal side end link member 5 is calculated in response to the position of the distal end side link hub 3 set by the setting instrument. The rotation angle βn represents an operating position of the position changing actuator 73. The calculation of the rotation angle βn is carried out by inverse transformation of the following equation 1. The inverse transformation is a transformation for calculating the rotation angle βn of the proximal side end link member 5 from the bending angle θ (FIG. 3) of the central axis QB of the distal end side link hub 3 relative to the central axis QA of the proximal end side link hub 2 and the turning angle φ (FIG. 3) of the distal end side link hub 3 relative to the proximal end side link hub 2. In other words, the bending angle θ is a vertical angle formed when the central axis QB of the distal end side link hub 3 is inclined relative to the central axis QA of the proximal end side link hub 2, and the turning angle φ is a horizontal angle formed when the central axis QB of the distal end side link hub 3 is inclined relative to the central axis QA of the proximal end side link hub 2.

$$\cos(\theta/2)\sin\beta n - \sin(\theta/2)\sin(\varphi+\delta n)\cos\beta n + \sin(\gamma/2) = 0 \quad \text{(Equation 1)}$$

In this equation, γ (FIG. 3) is the angle between the connection end axis of the intermediate link member 7 pivotably connected to the proximal side end link member 5 and the connection end axis of the intermediate link member 7 pivotably connected to the distal side end link member 6. δn (δ1, δ2, and δ3 shown in FIG. 3) is the angle of spacing, in the circumferential direction, of each proximal side end link member 5 relative to a proximal side end link member 5 that serves as a reference.

After the control target value of the rotation angle βn is calculated, feedback control is performed on each of the two position changing actuators 73 such that the rotation angle βn becomes the control target value, by utilizing a signal from a position detection unit 79 for detecting the position of the distal end side link hub 3. The position detection unit 79 detects the rotation angle βn (β1 and β2 shown in FIG. 3) of the proximal side end link member 5 as shown in FIG. 3, for example. The bending angle θ and the turning angle φ have a mutual relationship with the rotation angle βn, and accordingly, from one value, the other value can be obtained.

As described above, by controlling the rotation drive of each of the two position changing actuators 73, the location and position of the distal end side link hub 3 relative to the proximal end side link hub 2 may be determined. Since only two of the three link mechanisms 4 are respectively provided with the position changing actuators 73, it is sufficient to control only the two position changing actuators 73. Compared with the case where all of the three link mechanisms 4 are respectively provided with the position changing actuators 73, smooth operation of the position changing actuators 73 are allowed, and a fast operation speed may be realized.

Figure 15:
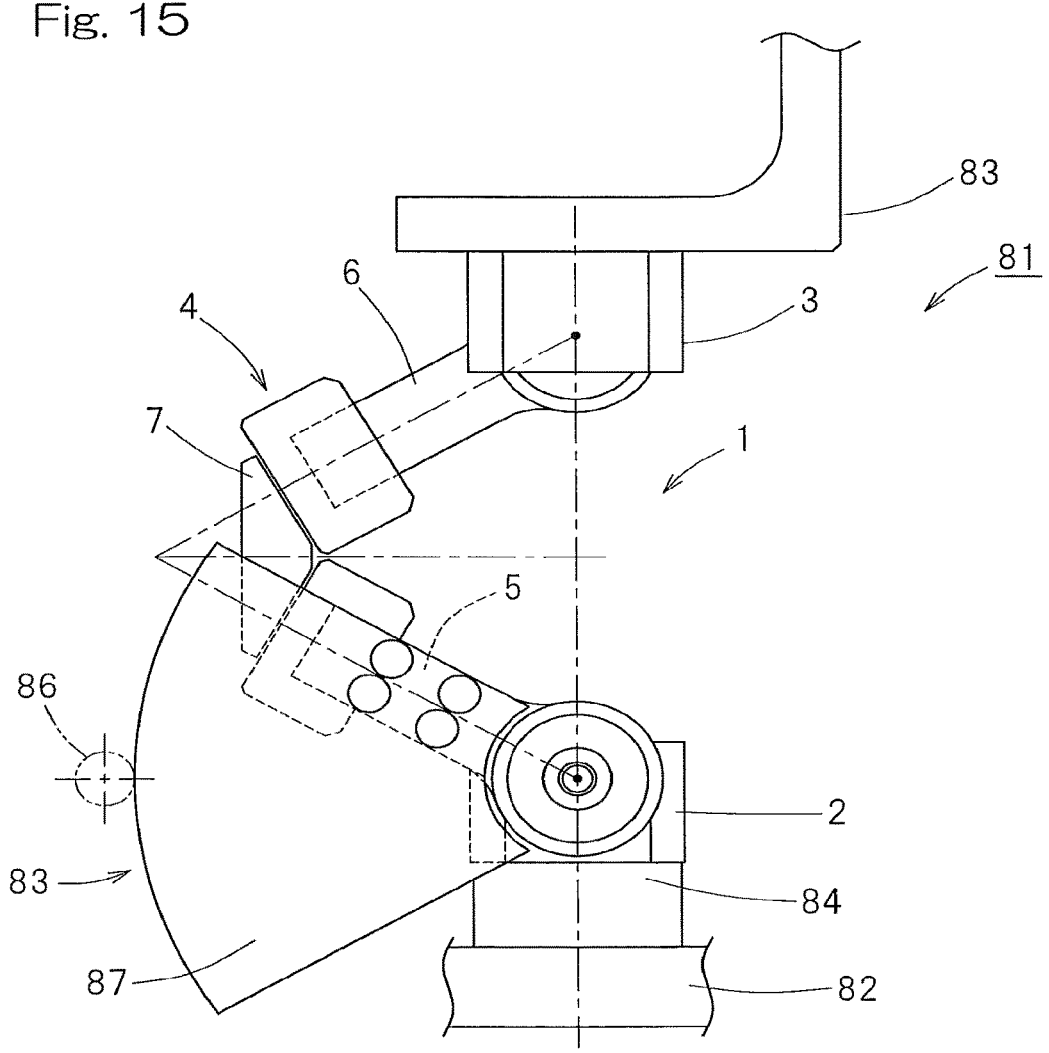
FIG. 15 is a front view of a link actuator, with a portion thereof omitted, according to a fifth embodiment of the present invention.
Figure 16:
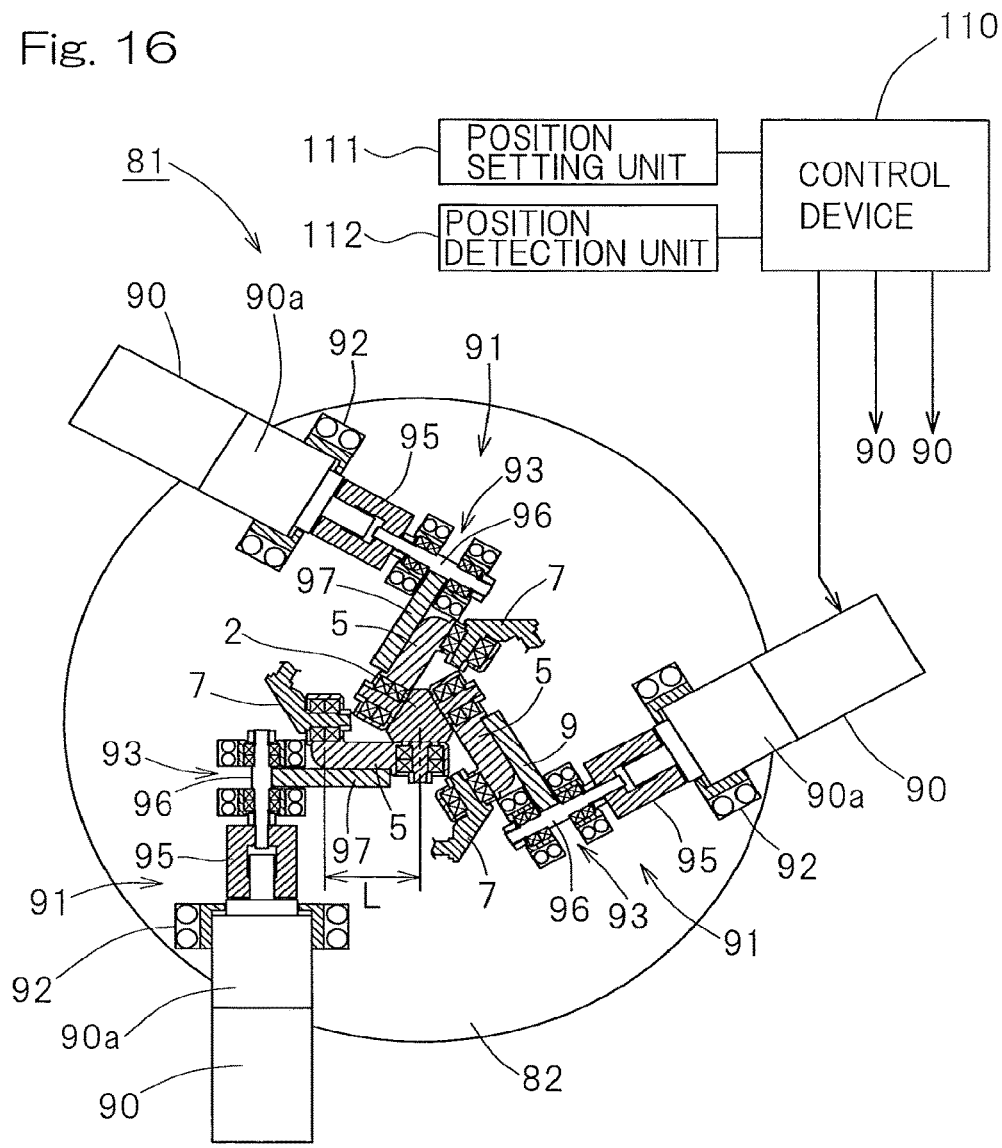
FIG. 16 is a longitudinal sectional view of a portion of the link actuator.
Figure 17:
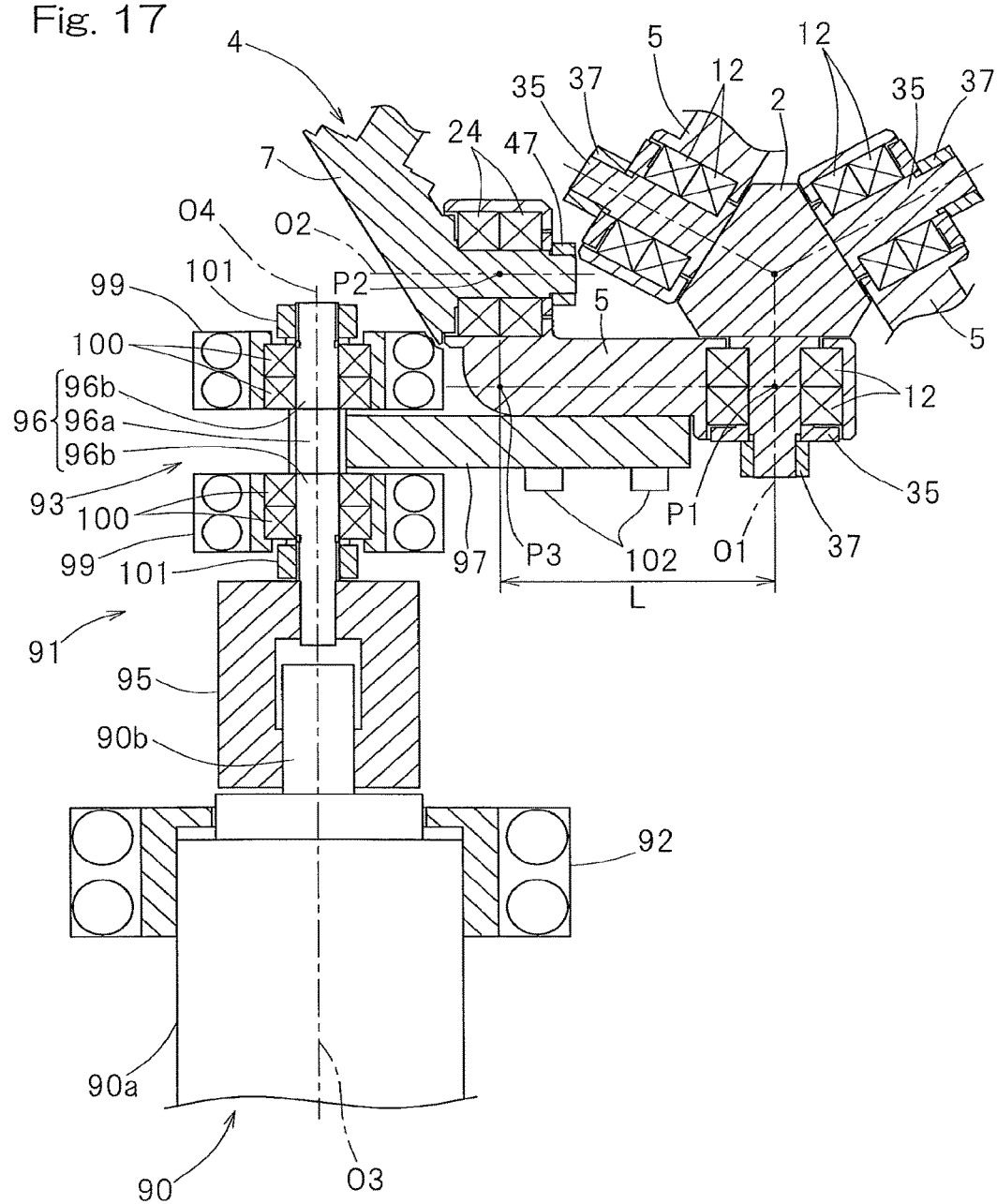
FIG. 17 is a partial enlarged view of FIG. 16.

FIGS. 15 to 17 show a different link actuator according to a fifth embodiment of the present invention, which uses a parallel link mechanism. In FIG. 15, this link actuator 81 is of a type in which a distal end mounting member 83, on which a various type of instrument or the like is mounted, is connected to a base 82 via the parallel link mechanism 1 shown in FIG. 8 to FIG. 11, such that alteration in position is allowed. Between the base 82 and the proximal end side link hub 2 of the parallel link mechanism 1, a spacer 84 is interposed.

As shown in FIG. 16 and also in FIG. 17 being a partial enlarged view of FIG. 16, at least two of the three link mechanisms 4 of the parallel link mechanism 1 are each provided with a position changing actuator 90 which arbitrarily changes the position of the distal end side link hub 3 relative to the proximal end side link hub 2 by driving its corresponding proximal side end link member 5 to pivot, and a reduction gear unit 91 which transmits the amount of operation of the position changing actuator 90 to the proximal side end link member 5 after reducing the speed thereof.

In the example shown, all of the three link mechanisms 4 are each provided with the position changing actuator 90 and the reduction gear unit 91.

The position changing actuator 90 may be in the form of a rotary actuator, more specifically, a servomotor equipped with a reduction gear 90a, and is fixed to the base 82 by means of a motor fixing member 92. The reduction gear unit 91 may be composed of the reduction gear 90a of the position changing actuator 90 and a geared speed reducing section 93.

The geared speed reducing section 93 includes a small gear 96 connected to an output shaft 90b of the position changing actuator 90 via a coupling 95 in a rotation transmittable manner, and a large gear 97 fixed to the proximal side end link member 5 and configured to be meshed with the small gear 96. In the example shown, each of the small gear 96 and the large gear 97 is a spur gear, and the large gear 97 is a sector gear of a sector shape having gear teeth formed only on a peripheral surface thereof. The large gear 97 has a radius of pitch circle greater than that of the small gear 96, and the rotation of the output shaft 90b of the position changing actuator 90 is transmitted to the proximal side end link member 5 after the rotation has been reduced in speed and made into rotation about a rotation axis O1 of the revolute pair between the proximal end side link hub 2 and the proximal side end link member 5. The speed reduction ratio is set to be 10 or higher.

The radius of the pitch circle of the large gear 97 is set to be greater than or equal to ½ of an arm length L of the proximal side end link member 5. The arm length L is defined as a distance from an axial center point P1 of a central axis O1 of the revolute pair between the proximal end side link hub 2 and the proximal side end link member 5, to a point P3, the point P3 being obtained by projecting an axial center point P2 of a central axis O2 of the revolute pair between the proximal side end link member 5 and the intermediate link member 7 onto a plane that is orthogonal to the axis O1 of the revolute pair between the proximal end side link hub 2 and the proximal side end link member 5 and that contains the axial center point P1. In the case of this embodiment, the radius of the pitch circle of the large gear 97 is greater than or equal to the arm length L, which is advantageous for obtaining a high speed reduction ratio.

The small gear 96 has a tooth portion 96a meshed with the large gear 97 and shank portions 96b protruding towards opposite sides of the tooth portion 96a. Each shank portion 96b is rotatably supported by two bearings 100 provided on a corresponding one of rotation support members 99 disposed on the base 82. Each bearing 100 may be a ball bearing such as, for example, a deep groove ball bearing or an angular contact ball bearing. In place of the ball bearings disposed in a plurality of rows as in the example shown, a roller bearing and/or a slide bearing may be employed. The outer rings (not shown) of the respective two bearings 100 have a shim (not shown) disposed therebetween, and by fastening a nut 101 threadedly engaged on the shank portion 96b, each bearing 100 is to receive a preload. The outer ring of the bearing 100 is press-fitted into the rotation support member 99.

In the case of the fifth embodiment, the large gear 97 is a member separate from the proximal side end link member 5, and is removably mounted on the proximal side end link member 5 by means of connecting members 102 such as bolts or the like. The large gear 97 may be provided integrally with the proximal side end link member 5.

As shown in FIG. 17, a rotation axis O3 of the position changing actuator 90 is aligned with a rotation axis O4 of the small gear 96. These rotation axes O3 and O4 are set to be parallel to the axis O1 of the revolute pair between the proximal end side link hub 2 and the proximal side end link member 5, and at the same level in height from the base 82.

As shown in FIG. 16, each position changing actuator 90 is controlled by a control device 110. The control device 110 is of a type capable of being numerically controlled by a computer, and provides each position changing actuator 90 with an output command based on a signal from a position setting unit 111, which sets a position of the distal end side link hub 3 relative to the proximal end side link hub 2, and a signal from a position detection unit 112, which detects the position of the distal end side link hub 3 relative to the proximal end side link hub 2. The position setting unit 111 sets the position of the distal end side link hub 3, by determining, for example, the bending angle θ (refer to FIG. 3) and the turning angle φ (refer to FIG. 3). The position detection unit 112 detects the rotation angle βn (β1 and β2 in FIG. 3) of each proximal side end link member 5 by means of, for example, an encoder (not shown). Alternatively, an encoder (not shown) of the position changing actuator 90 may be used for detecting the position of the distal end side link hub 3. The bending angle θ and the turning angle φ have a mutual relationship with each rotation angle βn, and from one value, the other value can be obtained.

In a case where the position of the distal end side link hub 3 is to be altered relative to the proximal end side link hub 2, a control target value of the rotation angle βn of each proximal side end link member 5 is calculated in response to the position of the distal end side link hub 3 set by the position setting unit 111. The rotation angle βn above represents the operating position of the position changing actuator 90. The calculation of the rotation angle βn is carried out by inverse transformation of equation 1 above. The inverse transformation is a transformation for calculating the rotation angle βn of the proximal side end link member 5 from the bending angle θ and the turning angle φ.

After the control target value of the rotation angle βn is calculated, by a feedback control utilizing the signal from the position detection unit 112, an output of each position changing actuator 90 is controlled such that the actual rotation angle βn becomes the control target value. Accordingly, the proximal side end link members 5 of all of the link mechanisms 4 are each rotated by the determined rotation angle βn, thereby causing the distal end side link hub 3 to have the position set by the position setting unit 111.

Despite the compactness in size, the link actuator 81 can have a wide range of movement of the distal end side link hub 3 relative to the proximal end side link hub 2. Thus, operability of a medical instrument or the like mounted on the distal end mounting member 83 is good. Since all of the three link mechanisms 4 are each provided with the position changing actuator 90 and the reduction gear unit 91, drive can be realized in good balance no matter what position is taken by the distal end side link hub 3 relative to the proximal end side link hub 2. In other words, the balance of driving force is good. Accordingly, each of the position changing actuators 90 can be made compact in size. Also, the provision of the position changing actuator 90 and the reduction gear unit 91 in all of the three link mechanisms 4 makes it possible to perform control such that rattling of the parallel link mechanism 1 and/or the reduction gear unit 91 can be cut down. Thus, the positioning accuracy of the distal end side link hub 3 can be increased, and also, the link actuator 81 itself can have a high rigidity.

The geared speed reducing section 93 of the reduction gear unit 91 is composed of a combination of the small gear 96 and the large gear 97, and is capable of providing the high speed reduction ratio of 10 or higher. Where the speed reduction ratio is high, the positioning resolution by the encoder and the like becomes high, and therefore, the positioning resolution of the distal end side link hub 3 increases. Also, the position changing actuator 90 of a low output may be used. In the fifth embodiment, although the position changing actuator 90 with the reduction gear 90a is used, if the speed reduction ratio of the geared speed reducing section 93 is high, it is possible to use the position changing actuator 90 having no reduction gear, and as a result, the position changing actuator 90 can be made compact in size.

Since the radius of the pitch circle of the large gear 97 is set to be greater than or equal to ½ of the arm length L of the proximal side end link member 5, the bending moment of the proximal side end link member 5, which is caused by a distal end loading, becomes small. For this reason, the rigidity of the link actuator 81 as a whole can be maintained at a value not higher than necessary, and also the weight of the proximal side end link member 5 can be reduced. For example, the material of the proximal side end link member 5 can be changed from stainless steel (SUS) to aluminium. Also, since the radius of the pitch circle of the large gear 97 is relatively large, the surface pressure of a tooth portion of the large gear 97 decreases and the rigidity of the link actuator 81 as a whole increases.

Further, as shown in FIG. 17, if the radius of the pitch circle of the large gear 97 is greater than or equal to ½ of the arm length, the large gear 97 comes to have a sufficiently larger diameter than the outer diameter of each bearing 12 that is disposed at the revolute pair section between the proximal end side link hub 2 and the proximal side end link member 5. Accordingly, space is created between the tooth portion of the large gear 97 and the bearing 12, and thus, the large gear 97 is easy to be disposed.

Particularly in the case of the fifth embodiment, since the radius of the pitch circle of the large gear 97 is greater than or equal to the arm length L, the radius of the pitch circle of the large gear 97 is further increased, and the operations and effects are further remarkably exhibited. In addition, it becomes possible to dispose the small gear 96 on the outer diameter side relative to the link mechanism 4. As a result, the space for providing the small gear 96 may be easily secured and the degree of freedom of designing may increase. Also, the interference between the small gear 96 and any other member will hardly occur, and the range of movement of the link actuator 81 may expand.

Since the small gear 96 and the large gear 97 are each a spur gear, the manufacture thereof is easy and the transmission efficiency of rotation is high. Since the small gear 96 is supported by the bearings 100 on axially opposite sides, the support rigidity of the small gear 96 is high. Accordingly, the angle retaining rigidity of the proximal side end link member 5 under the distal end loading increases, and as a result, increase of the rigidity and the positioning accuracy of the link actuator 81 is achieved. Also, since the rotation axis O3 of the position changing actuator 90, the rotation axis O4 of the small gear 96, and the central axis O1 of the revolute pair between the proximal end side link hub 2 and the proximal side end link member 5 lie on the same plane, excellent overall balance and assemblability may be obtained.

Since the large gear 97 is removable from the proximal side end link member 5, change in specification such as, for example, the speed reduction ratio of the geared speed reducing section 93 and the range of operation of the distal end side link hub 3 relative to the proximal end side link hub 2 becomes easy, and the mass productivity of the link actuator 81 increases, accordingly. In other words, the link actuator 81 can be applied to various applications merely by changing the large gear 97. Moreover, the maintenance is good. For example, when any trouble occurs in the geared speed reducing section 93, mere replacement of only the geared speed reducing section 93 is enough.

Figure 18:
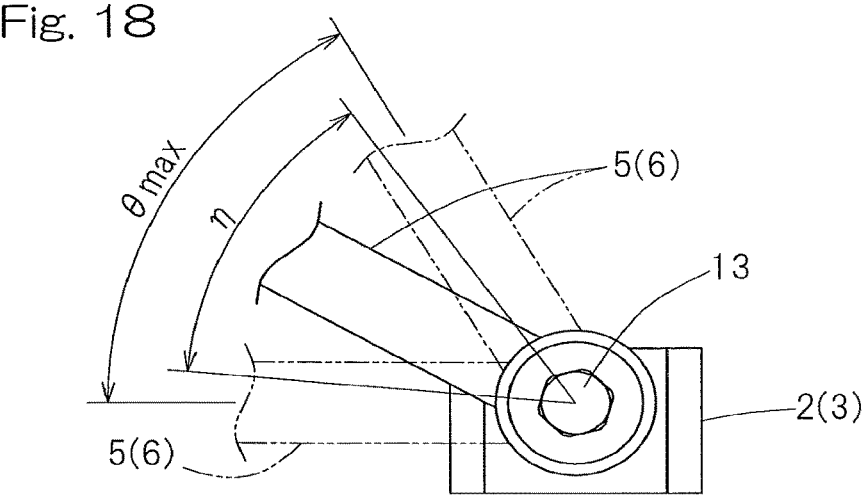
FIG. 18 shows relationship between a range of movement and a critical oscillation angle of an end link member in a parallel link mechanism according to a sixth embodiment of the present invention.
Figure 19:
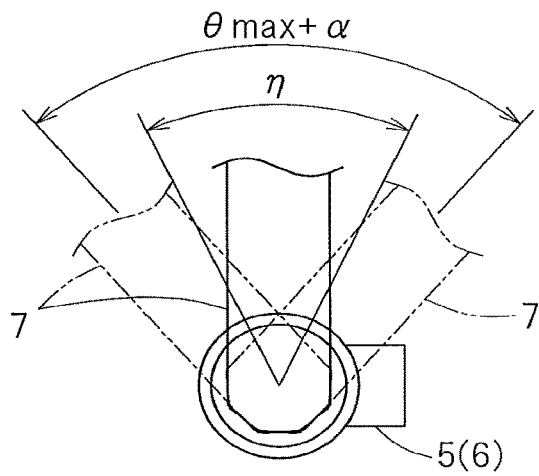
FIG. 19 shows relationship between a range of movement and a critical oscillation angle of an intermediate link member in the parallel link mechanism.

Next, a sixth embodiment of the parallel link mechanism according to the present invention will be described with reference to FIGS. 18 to 20. In this embodiment, FIG. 1 to FIG. 5, FIG. 8 and FIG. 9, FIG. 13 to FIG. 17 used in the description of the first to the fifth embodiments described above are also applicable to this embodiment, and thus, by incorporating these figures in this embodiment, detailed description thereof is omitted. Thus, the sealing structure 19 (21), described in each embodiment above, which regulates the flow of a lubricant or the like between inside and outside of the bearings 12 (24) is constructed in the same manner also in this embodiment.

Due to the structure of the parallel link mechanism 1, each bearing 12, 24 in each revolute pair section oscillates. If the oscillation angle thereof is small, the life of the bearing under oscillation becomes long, but if the oscillation angle is reduced to some level or lower, fretting is caused and the bearing reaches the end of life early. Therefore, in order to realize a long life of the bearing 12, 24 arranged in each revolute pair section, as shown in FIG. 18 and FIG. 19, as the bearing 12, 24, a bearing is used which has a critical oscillation angle η, which is the minimum oscillation angle in a practically available range for a bearing, is smaller than the maximum value (maximum bending angle) $\theta_{max}$ of the bending angle θ between the central axis QA of the proximal end side link hub 2 and the central axis QB of the distal end side link hub 3. The maximum bending angle $\theta_{max}$ is the maximum value of the bending angle θ within a range possible under the structure of the parallel link mechanism 1, and more preferably, the maximum value of the bending angle θ in a predetermined work operation. The basis thereof is described below.

In Equation 1 obtained with reference to FIG. 3 in the first embodiment described above, from a change amount of the rotation angle βn obtained when the turning angle φ is changed while the maximum bending angle is set to $\theta_{max}$, the range of oscillation of the proximal side end link member 5 relative to the proximal end side link hub 2, and the range of oscillation of the distal side end link member 6 relative to the distal end side link hub 3 are obtained. Each obtained range of oscillation is $\theta_{max}$ (FIG. 18). On the other hand, the range of oscillation of the intermediate link member 7 relative to the end link member 5, 6 becomes greater than $\theta_{max}$ due to the structure of the parallel link mechanism 1 (FIG. 19), although description of the structural calculation equation is omitted. Therefore, with respect to the bearing 12, 24 of each revolute pair section, when the critical oscillation angle η is set to be smaller than or equal to $\theta_{max}$, every bearing 12, 24 will be driven at the critical oscillation angle η or greater, whereby a long life of the bearing can be realized.

In a case where the bearing 12, 24 having a critical oscillation angle η smaller than the maximum value of the bending angle in the predetermined work operation is to be used, occurrence of fretting or the like during the determined work operation can be prevented, and thus, a further longer life of the bearing can be realized.

Now, a supplementary explanation of the critical oscillation angle η is given. When the oscillation angle of a bearing is very small, an oil film is difficult to be formed on the contact surfaces between the bearing rings and the rolling elements, which may cause fretting (fretting corrosion). The critical oscillation angle q in the case of inner ring oscillation is expressed by Equation 2 below.

$$\eta \geq (360/Z) \cdot \{d_p/(d_p - D_p \cdot \cos \alpha)\} \quad \text{(Equation 2)}$$

where Z: the number of rolling elements (per row); $d_p$: pitch circle diameter of rolling elements; $D_p$: rolling element diameter; α: contact angle In the case of outer ring oscillation, the right side denominator is $(d_p + D_p \cdot \cos \alpha)$.

Figure 20:
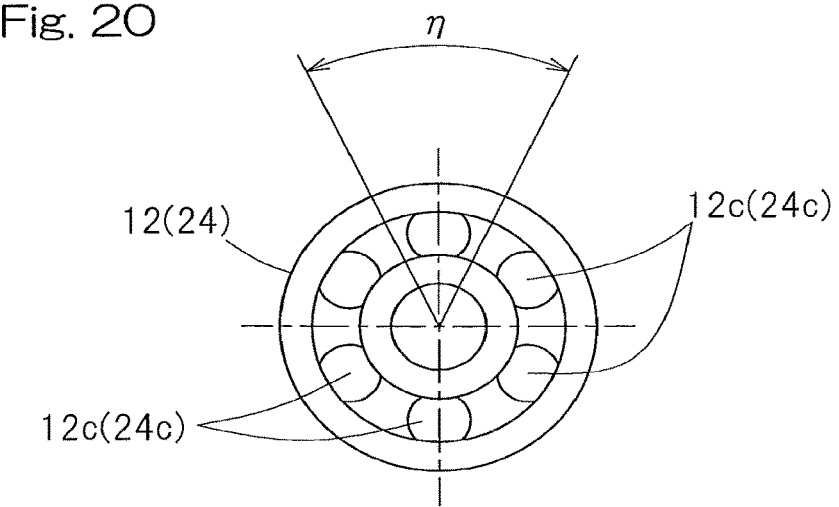
FIG. 20 shows a critical oscillation angle of a bearing in the parallel link mechanism.

Specifically, in a case where the bearing 12 (24) is a deep groove ball bearing as shown in FIG. 20, where the number of rolling elements 12c (24c) of the deep groove ball bearing is Z, the critical oscillation angle η is set to be $2 \cdot 180/(0.555 \cdot Z \cdot \pi)$[deg]. In a case where the bearing 12 (24) is a cylindrical roller bearing (not shown), where the number of rolling elements of the cylindrical roller bearing is Z, the critical oscillation angle η is set to be $2 \cdot 180/(0.37 \cdot (Z+0.1) \cdot \pi)$[deg]. In a case where the bearing 12 (24) is a needle roller bearing (not shown), where the number of rolling elements of the needle roller bearing is Z, the critical oscillation angle η is set to be $2 \cdot 180/(0.544 \cdot Z \cdot \pi)$[deg]. The values of the critical oscillation angle determined as described above substantially match optimum values of the critical oscillation angle η obtained from experimental data.

As shown in FIG. 9 which is incorporated in this embodiment, with respect to each bearing 24 supporting the intermediate link member 7 relative to the proximal side end link member 5, the outer ring (not shown) of the bearing 24 is fitted on the inner periphery of the communication hole 44 formed at the distal end of the proximal side end link member 5, and the inner ring (not shown) of the bearing 24 is fitted on the outer periphery of the shaft portion 45 integrally provided with the intermediate link member 7. Through fastening with the nut 47 threadedly engaged on the distal end threaded portion 45a of the shaft portion 45, a predetermined preload amount is applied to the bearing 24 via the spacer 46. The revolute pair section between the distal side end link member 6 and the intermediate link member 7 has the same structure as that described above. As in the embodiment above, this parallel link mechanism 1 also uses, as the bearing 12, 24, a bearing whose critical oscillation angle η is smaller than the maximum bending angle $\theta_{max}$.

The present invention encompasses the following applied mode 1 to 7 that do not include sealing structures, in addition to the embodiments described above.

[Applied Mode 1]

A parallel link mechanism according to an applied mode 1 is a parallel link mechanism 1 including: a proximal end side link hub 2; a distal end side link hub 3; and three or more link mechanisms 4 which connect the distal end side link hub 3 to the proximal end side link hub 2 such that alteration in position is allowed, wherein each of the link mechanisms 4 includes: a proximal side end link member 5, one end of the proximal side end link member 5 being pivotably connected to the proximal end side link hub 2; a distal side end link member 6, one end of the distal side end link member 6 being pivotably connected to the distal end side link hub 3; and an intermediate link member 7 whose two ends are pivotably connected to the other ends of the proximal side end link member 5 and the distal side end link member 6, respectively, wherein each of the link mechanisms 4 has such a shape that a geometric model of the link mechanism 4 depicted in lines shows symmetry between a proximal end side portion thereof and a distal end side portion thereof with respect to an intermediate portion of the intermediate link member 7, wherein a revolute pair between the proximal end side link hub 2 and the one end of the proximal side end link member 5, a revolute pair between the distal end side link hub 3 and the one end of the distal side end link member 6, and revolute pairs between the other ends of the proximal side and distal side end link members 5, 6 and the two ends of the intermediate link member 7 each have a bearing interposed therein, and wherein as each bearing, a bearing whose critical oscillation angle is smaller than the maximum value in a possible range of a bending angle which is an angle between a central axis of the proximal end side link hub QA and a central axis of the distal end side link hub is used QB.

[Applied Mode 2]

In the applied mode 1, the critical oscillation angle is smaller than the maximum value of the bending angle in a determined work operation.

[Applied Mode 3]

In the applied mode 1 or the applied modes 2, the bearing 12 (24) is a deep groove ball bearing, and when the number of rolling elements 12c (24c) of the deep groove ball bearing is Z, the critical oscillation angle is set to be $2 \cdot 180/(0.555 \cdot Z \cdot \pi)$[deg].

[Applied Mode 4]

In the applied mode 1 or the applied modes 2, the bearing 12 (24) is a cylindrical roller bearing, and when the number of rolling elements 12c (24c) of the cylindrical roller bearing is Z, the critical oscillation angle is set to be $2 \cdot 180/(0.37 \cdot (Z+0.1) \cdot \pi)$[deg].

[Applied Mode 5]

In the applied mode 1 or the applied modes 2, the bearing 12 (24) is a needle roller bearing, and when the number of rolling elements 12c (24c) of the needle roller bearing is Z, the critical oscillation angle is set to be $2 \cdot 180/(0.544 \cdot Z \cdot \pi)$[deg].

[Applied Mode 6]

The parallel link mechanism according to any one of the applied mode 1 to the applied modes 5 is provided, the proximal end side link hub 2 of this parallel link mechanism 1 is provided with an input shaft 63, and the distal end side link hub 3 thereof is provided with an output shaft 65.

[Applied Mode 7]

The parallel link mechanism according to any one of the applied mode 1 to the applied modes 5 is provided, and at least two of the three or more link mechanisms 4 of this parallel link mechanism are each provided with an actuator 71, 81 which alters the position of the distal end side link hub 3 relative to the proximal end side link hub 2 by rotating the proximal side end link member 5.

As described above, although the preferred embodiments have been described with reference to the accompanying drawings, those skilled in the art will readily conceive numerous changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

1 . . . Parallel link mechanism
2 . . . Proximal end side link hub

3 . . . Distal end side link hub
4 . . . Link mechanism
5 . . . Proximal side end link member
6 . . . Distal side end link member
7 . . . Intermediate link member
12, 24 . . . Bearing
12a, 24a . . . Inner ring
12b, 24b . . . Outer ring
13 . . . Shaft member (Shaft portion)
13a, 25a, 35a, 45a . . . Threaded portion
13c, 25c, 35c, 45c . . . Stepped portion
13d, 25d, 35d, 45d . . . Stepped surface
14, 27, 37, 47 . . . Nut (Inner ring fixation element)
15, 28, 38, 48 . . . Annular inner face forming portion
15a, 28a, 38a, 48a . . . Outer ring fit portion
15b, 28b, 38b, 48b . . . Stepped portion
15c, 28c, 38c, 48c . . . Stepped surface
16, 26, 36, 46 . . . Spacer member
18, 20, 30, 32, 40, 42, 50, 52 . . . Gap
19, 21, 31, 33, 41, 43, 51, 53, 57, 58 . . . Sealing structure
25, 35, 45 . . . Shaft portion
61 . . . Constant velocity universal joint
63 . . . Input shaft
65 . . . Output shaft
71, 81 . . . Link actuator
73, 90 . . . Position changing actuator
T1, T2, T3, T4 . . . Revolute pair section
QA . . . Central axis of proximal end side link hub
QB . . . Central axis of distal end side link hub

What is claimed is:

1. A parallel link mechanism comprising:
a proximal end side link hub;
a distal end side link hub; and
three or more link mechanisms that connect the distal end side link hub to the proximal end side link hub in a position-changeable fashion,
each of the link mechanisms having a trinodal structure with four revolute pairs, and including a proximal side end link member, one end of the proximal side end link member being pivotably connected to the proximal end side link hub; a distal side end link member, one end of the distal side end link member being pivotably connected to the distal end side link hub; and an intermediate link member which is pivotably connected to the other ends of the proximal side end link member and the distal side end link member, and
each of the link mechanisms having such a shape that a geometric model of the link mechanism represented by lines shows symmetry between a proximal end side portion thereof and a distal end side portion thereof with respect to a center portion of the intermediate link member,
wherein each revolute pair of each of the link mechanisms includes one pair of pair constituent members connected to each other via a bearing,
wherein one of the pair constituent members is formed with a shaft portion fitted to an inner periphery of an inner ring of the bearing, and the other of the pair constituent members is formed with an annular inner face forming portion fitted to an outer periphery of an outer ring of the bearing, and
wherein each bearing of the revolute pairs has a critical oscillation angle smaller than a maximum value in a range of a bending angle which is defined as an angle between a central axis of the proximal end side link hub and a central axis of the distal end side link hub.

2. The parallel link mechanism as claimed in claim 1, wherein the critical oscillation angle is smaller than a maximum value of the bending angle obtained in a predetermined work operation.

3. The parallel link mechanism as claimed in claim 1, wherein the bearing is a deep groove ball bearing, a number of rolling elements of the deep groove ball bearing is represented by Z, and the critical oscillation angle is set to be $2 \cdot 180/(0.555 \cdot Z \cdot \pi)$[deg].

4. The parallel link mechanism as claimed in claim 1, wherein a number of rolling elements of the bearing is represented by Z, and the critical oscillation angle is set to be $2.180/(0.37 \cdot (Z+0.1) \cdot 7)$[deg].

5. The parallel link mechanism as claimed in claim 1, wherein a number of rolling elements of the bearing is represented by Z, and the critical oscillation angle is set to be $2 \cdot 180/(0.544 \cdot Z \cdot \pi)$[deg].

6. A constant velocity universal joint comprising the parallel link mechanism as claimed in claim 1, wherein the proximal end side link hub of the parallel link mechanism is provided with an input shaft, and the distal end side link hub of the parallel link mechanism is provided with an output shaft.

7. The parallel link mechanism as claimed in claim 1, further comprising a position changing actuator formed in each of two or more link mechanisms of the three or more link mechanisms in the parallel link mechanism to change an angle of at least one revolute pair of the four revolute pairs thereof.

* * * * *